United States Patent [19]

Asada et al.

[11] Patent Number: 5,098,357

[45] Date of Patent: Mar. 24, 1992

[54] AUTOMATIC PLANETARY GEAR TRANSMISSION

[75] Inventors: Toshiyuki Asada; Toshitake Suzuki; Yasunori Nakawaki; Yasuhiko Higushiyama; Akiharu Abe; Naoki Moriguchi, all of Susono, Japan; Naoki Moriguchi, all of Susono, Japan

[73] Assignee: Toyota Jidosha Kabushiki Kaisha, Toyota, Japan

[21] Appl. No.: 439,607

[22] Filed: Nov. 21, 1989

[30] Foreign Application Priority Data

Nov. 26, 1988 [JP] Japan .................. 63-299282
Mar. 10, 1989 [JP] Japan .................... 1-58406
Aug. 8, 1989 [JP] Japan ................... 1-205478

[51] Int. Cl.⁵ .................... F16H 3/44; F16H 57/10
[52] U.S. Cl. .................... 475/278; 475/284; 475/288
[58] Field of Search ........... 475/275, 277, 278, 284, 475/288, 330

[56] References Cited

U.S. PATENT DOCUMENTS

| | | | |
|---|---|---|---|
| 2,911,853 | 11/1959 | Sand | 475/277 X |
| 3,678,784 | 7/1972 | Lemieux . | |
| 3,811,343 | 5/1974 | Mori et al. . | |
| 3,863,524 | 2/1975 | Mori et al. . | |
| 3,877,320 | 4/1975 | Iijima . | |
| 3,899,940 | 8/1975 | Iijima . | |
| 3,946,624 | 3/1976 | Murakami et al. . | |
| 3,971,267 | 7/1976 | Murakami et al. . | |
| 4,089,238 | 5/1978 | Forster et al. | 475/278 X |
| 4,233,861 | 11/1980 | Gaus et al. | 475/278 X |
| 4,660,439 | 4/1987 | Hiraiwa | 475/278 X |
| 4,774,856 | 10/1988 | Hiraiwa . | |
| 4,939,955 | 7/1990 | Sugano | 475/278 |
| 4,963,124 | 10/1990 | Takahashi et al. | 475/278 |

FOREIGN PATENT DOCUMENTS

| | | | |
|---|---|---|---|
| 1530599 | 10/1969 | Fed. Rep. of Germany | 475/277 |
| 2141354 | 8/1971 | Fed. Rep. of Germany . | |
| 2406124 | 10/1974 | Fed. Rep. of Germany . | |
| 2612020 | 2/1976 | Fed. Rep. of Germany . | |
| 2751312 | 6/1978 | Fed. Rep. of Germany . | |
| 3511180A1 | 3/1985 | Fed. Rep. of Germany . | |
| 0164553 | 5/1985 | Fed. Rep. of Germany . | |
| 50-32913 | 10/1975 | Japan . | |
| 50-152329 | 12/1975 | Japan . | |
| 50-156175 | 12/1975 | Japan . | |
| 51-3012 | 1/1976 | Japan . | |
| 51-17767 | 2/1976 | Japan . | |
| 51-480620 | 4/1976 | Japan . | |
| 51-108168 | 9/1976 | Japan . | |
| 51-108170 | 9/1976 | Japan . | |
| 51-127968 | 11/1976 | Japan . | |
| 51-127968 | 11/1976 | Japan . | |
| 52-18571 | 2/1977 | Japan | 475/277 |
| 53-120045 | 10/1978 | Japan . | |
| 53-123762 | 10/1978 | Japan | 475/284 |
| 57-137047 | 5/1982 | Japan . | |
| 0121259 | 3/1984 | Japan . | |
| 61-45139 | 3/1986 | Japan | 475/275 |

Primary Examiner—Dwight Diehl
Attorney, Agent, or Firm—Cushman, Darby & Cushman

[57] ABSTRACT

A planetary gear device having a first and a second single-pinion planetary gear unit and a third double-pinion planetary gear unit, which are coaxially disposed so as to provide different speed reduction ratios. The three gear units have respective first, second and third sun gears, respective first, second and third ring gears, and respective first, second and third carriers rotatably supporting planetary pinions. The first and second sun gears are fixed together or selectively connectable to each other, and the first carrier, second ring gear and third carrier are fixed together or selectively connectable to each other. Further, the second carrier and the third sun gear are fixed together or selectively connectable to each other. The present arrangement allows shifting operations of the gear device, without concurrent disengagement and engagement of different clutches.

29 Claims, 31 Drawing Sheets

FIG.1B.

| | CLUTCHES | | BRAKES | | | SPEED REDUCTION RATIO ($\rho_1 = 0.312, \rho_2 = 0.385, \rho_3 = 0.443$) | |
|---|---|---|---|---|---|---|---|
| | K2 | K3 | B1 | B2 | B3 | | |
| 1st | ○ | × | ○ | × | × | $[\rho_1(1+\rho_2)+\rho_2\rho_3]/\rho_2\rho_3$ | 3.534 |
| 2nd | ○ | × | × | ○ | × | $(\rho_1+\rho_2+\rho_1\rho_2)/\rho_2$ | 2.122 |
| 3rd | ○ | × | × | × | ○ | $1+\rho_1$ | 1.312 |
| 4th | ○ | ○ | × | × | × | $1$ | 1.000 |
| 5th | × | ○ | × | × | ○ | $\dfrac{(1+\rho_1)(1+\rho_2)(1-\rho_3)}{\rho_3(\rho_1+\rho_2+\rho_1\rho_2)+(1+\rho_1)(1+\rho_2)(1-\rho_3)}$ | 0.737 |
| 6th | × | ○ | × | ○ | × | $\rho_3$ | 0.443 |
| Rev | × | × | ○ | × | ○ | $-(1+\rho_1)(1+\rho_2)(1-\rho_3)/\rho_3$ | −2.285 |

|  | CLUTCHES ||| BRAKES |||
| --- | --- | --- | --- | --- | --- | --- |
|  | K1 | K2 | K3 | B1 | B2 | B3 |
| 1 st | O | O | × | O | × | × |
| 2 nd | O | O | × | × | O | × |
| 3 rd | O | O | × | × | × | O |
| 4 th | O | O | O | × | × | × |
| 5 th | × | O | O | × | × | O |
| 6 th | O | × | O | × | × | O |
| 7 th | O * | × * | O | × | O | × |
| R : r | O | × | × | O | × | O |

(*) ONE OF THESE TWO CLUTCHES IS ENGAGED

| | CLUTCHES | | | | BRAKES | | |
|---|---|---|---|---|---|---|---|
| | K1 | K2 | K3 | K4 | B1 | B2 | B3 |
| 1st | ○ | ○ | × | × | ○ | × | × |
| 2nd | ○ | ○ | × | × | × | ○ | × |
| 3rd | ○ | ○ | × | × | × | × | ○ |
| 4th | ○ | ○ | ○ | × | × | × | × |
| 5th | × | ○ | ○ | × | × | × | ○ |
| 6th | ○ | × | ○ | × | × | × | ○ |
| 7th | ○* | ×* | ○ | × | × | ○ | × |
| Rev | × | ○ | × | ○ | × | ○ | × |
| Rev2 | ○ | × | × | × | ○ | × | ○ |

(*) ONE OF THESE TWO CLUTCHES IS ENGAGED

| | CLUTCHES | | | | BRAKES | | |
|---|---|---|---|---|---|---|---|
| | K1 | K2 | K3 | K5 | B1 | B2 | B3 |
| 1st | ○ | ○ | × | ○ | ○ | × | × |
| 2nd | ○ | ○ | × | ○ | × | ○ | × |
| 3rd | ○ | ○ | × | ○ | × | × | ○ |
| 4th | ○ | ○ | ○ | ○ | × | × | × |
| 5th | ○*1 | ○ | ○ | ×*1 | × | × | ○ |
| 6th | ○ | × | ○ | ○ | × | × | ○ |
| 7th | ×*2 | ×*2 | ○ | ×*2 | × | ○ | ×*2 |
| Rev | ○ | × | × | ○ | ○ | × | ○ |

(*1) ONE OF THESE CLUTCHES MAY BE ENGAGED
(*2) THESE MEMBERS MAY BE ENGAGED PROVIDED THE FIRST, SECOND AND THIRD PLANETARY GEAR UNITS DO NOT LOCK

|   | CLUTCHES | | | BRAKES | | |
|---|---|---|---|---|---|---|
|   | K2 | K3 | K5 | B1 | B2 | B3 |
| 1st | O | × | O | O | × | × |
| 2nd | O | × | O | × | O | × |
| 3rd | O | × | O | × | × | O |
| 4th | O | O | O | × | × | × |
| 5th | O | O | × | × | × | O |
| 6th | × | O | O | × | × | O |
| 7th | ×* | O | ×* | × | O | ×* |
| Rev | × | × | O | O | × | O |

(*) ONE OF THESE CLUTCHES MAY BE ENGAGED

|  | CLUTCHES | | | | BRAKES | | |
|---|---|---|---|---|---|---|---|
|  | K1 | K2 | K5 | K6 | B1 | B2 | B3 |
| 1st | ○ | ○ | ○ | × | ○ | × | × |
| 2nd | ○ | ○ | ○ | × | × | ○ | × |
| 3rd | ○ | ○ | ○ | × | × | × | ○ |
| 4th | ○ | ○ | ○ | ○ | × | × | × |
| 5th | ○ | ○ | × | ○ | × | × | ○ |
| 6th | ○ | × | ○ | ○ | × | × | ○ |
| 7th | ○ | ×* | ×* | ○ | × | ○ | ×* |
| Rev | ○ | × | ○ | × | ○ | × | ○ |

(*) ONE OF THESE CLUTCHES MAY BE ENGAGED

|  | CLUTCHES | | | | | BRAKES | | |
|---|---|---|---|---|---|---|---|---|
|  | K1 | K2 | K3 | K4 | K5 | B1 | B2 | B3 |
| 1st | O | O | × | × | O | O | × | × |
| 2nd | O | O | × | × | O | × | O | × |
| 3rd | O | O | × | × | O | × | × | O |
| 4th | O | O | O | × | O | × | × | × |
| 5th | O*1 | O | O | × | ×*1 | × | × | O |
| 6th | O | × | O | × | O | × | × | O |
| 7th | O*2 | O*2 | O | × | O*2 | × | O | O*2 |
| Rev | O*1 | O | × | O | ×*1 | × | O | × |

(*1) ONE OF THESE CLUTCHES MAY BE ENGAGED
(*2) THESE MEMBERS MAY BE ENGAGED PROVIDED THE FIRST, SECOND AND THIRD PLANETARY GEAR UNITS DO NOT LOCK

|  | CLUTCHES |  |  |  |  | BRAKES |  |  |
|---|---|---|---|---|---|---|---|---|
|  | K1 | K2 | K4 | K5 | K6 | B1 | B2 | B3 |
| 1st | O | O | × | O | × | O | × | × |
| 2nd | O | O | × | O | × | × | O | × |
| 3rd | O | O | × | O | × | × | × | O |
| 4th | O | O | × | O | O | × | × | × |
| 5th | O | × | × | O | O | O | × | O |
| Rev | O | O | O | × | × | × | O | × |

|  | CLUTCHES |  |  |  | BRAKES |  |  |
|---|---|---|---|---|---|---|---|
|  | K 2 | K 3 | K 4 | K 5 | B 1 | B 2 | B 3 |
| 1 st | ○ | × | × | ○ | ○ | × | × |
| 2 nd | ○ | × | × | ○ | × | ○ | × |
| 3 rd | ○ | × | × | ○ | × | × | ○ |
| 4 th | ○ | ○ | × | ○ | × | × | × |
| 5 th | × | ○ | × | ○ | × | × | ○ |
| R ev | ○ | × | ○ | × | × | ○ | × |

|     | CLUTCHES |   |   |   |   | BRAKES |   |   |
| --- | --- | --- | --- | --- | --- | --- | --- | --- |
|     | K1 | K2 | K3 | K5 | K7 | B1 | B2 | B3 |
| 1st | O | O | × | O | × | O | × | × |
| 2nd | O | O | × | O | × | × | O | × |
| 3rd | O | O | × | O | × | × | × | O |
| 4th | O | O | O | O | × | × | × | × |
| 5th | O | × | O | O | × | × | × | O |
| Rev | O | O | × | × | O | × | O | × |

|  | CLUTCHES | | | | | BRAKES | | |
|---|---|---|---|---|---|---|---|---|
|  | K1 | K2 | K5 | K6 | K7 | B1 | B2 | B3 |
| 1st | O | O | O | × | × | O | × | × |
| 2nd | O | O | O | × | × | × | O | × |
| 3rd | O | O | O | × | × | × | × | O |
| 4th | O | O | O | O | × | × | × | × |
| 5th | O | × | O | O | × | × | × | O |
| R | O | O | × | × | O | × | O | × |

|  | CLUTCHES | | | | BRAKES | | |
| --- | --- | --- | --- | --- | --- | --- | --- |
|  | K1 | K2 | K3 | K8 | B1 | B2 | B3 |
| 1st | ○ | ○ | × | ○ | ○ | × | × |
| 2nd | ○ | ○ | × | ○ | × | ○ | × |
| 3rd | ○ | ○ | × | ○ | × | × | ○ |
| 4th | ○ | ○ | ○ | ○ | × | × | × |
| 5th | ○* | ○ | ○ | ×* | × | × | ○ |
| 6th | ○ | × | ○ | ○ | × | × | ○ |
| Rev | ○ | × | × | ○ | ○ | × | ○ |

(*) ONE OF THESE CLUTCHES MAY BE ENGAGED

|  | CLUTCHES | | | | BRAKES | | |
|---|---|---|---|---|---|---|---|
|  | K1 | K2 | K6 | K8 | B1 | B2 | B3 |
| 1st | ○ | ○ | × | ○ | ○ | × | × |
| 2nd | ○ | ○ | × | ○ | × | ○ | × |
| 3rd | ○ | ○ | × | ○ | × | × | ○ |
| 4th | ○ | ○ | ○ | ○ | × | × | × |
| 5th | ○ | ○ | ○ | × | × | × | ○ |
| 6th | ○ | × | ○ | ○ | × | × | ○ |
| R | ○ | × | × | ○ | ○ | × | ○ |

|  | CLUTCHES | | | BRAKES | | |
|---|---|---|---|---|---|---|
|  | K 2 | K 3 | K 8 | B 1 | B 2 | B 3 |
| 1 st | ○ | × | ○ | ○ | × | × |
| 2 nd | ○ | × | ○ | × | ○ | × |
| 3 rd | ○ | × | ○ | × | × | ○ |
| 4 th | ○ | ○ | ○ | × | × | × |
| 5 th | ○ | ○ | × | × | × | ○ |
| 6 th | × | ○ | ○ | × | × | ○ |
| R : | × | × | ○ | ○ | × | ○ |

FIG.15B.

| | CLUTCHES | | | | | BRAKES | | | SPEED REDUCTION RATIO |
|---|---|---|---|---|---|---|---|---|---|
| | K11 | K12 | K13 | K14 | K15 | B11 | B12 | B13 | ($\rho_1 = 0.164, \rho_2 = 0.482, \rho_3 = 0.302$) |
| 1st | O | x | x | O*1 | O | O*1 | x | O*1 | $\dfrac{\rho_2 - \rho_1 + \rho_1 \rho_2}{\rho_2 (1 - \rho_3)}$ = 3.471 |
| 2nd | O | x*1 | x | x*1 | O*1 | O*1 | O*1 | x*1 | $(1 + \rho_1) / (1 - \rho_3)$ = 2.094 |
| 3rd | O | x*2 | O | x*2 | O*2 | O*2 | x | x*2 | $1 / (1 - \rho_3)$ = 1.432 |
| 4th | O*3 | O*3 | O | O | O*3 | x | x | x | 1 = 1.000 |
| 5th | x | O | O | O | x | x | O | x | $1 / ((1 + \rho_2)(1 - \rho_3) + \rho_3)$ = 0.749 |
| Rev | x | x | x | O*3 | O | O*3 | x | O*3 | $-1 / \rho_2 (1 - \rho_3)$ = -2.981 |
| 2.5th | O | x | x | O | O | x | O | x | $\dfrac{(1 + \rho_1)(1 + \rho_2)}{1 + \rho_2 - \rho_2 \rho_3}$ = 1.623 |
| 3.5th | O | x | O | O | x | x | O | x | $(1 + \rho_2) / (1 + \rho_2 - \rho_2 \rho_3)$ = 1.109 |

(*) TWO OR ALL OF THESE THREE MEMBERS ARE ENGAGED
(*1) K15, B11 AND B12 ARE ENGAGED, OR K12 AND TWO OR ALL OF K14, B11 AND B13 ARE ENGAGED
(*2) B11 AND ONE OR BOTH OF K12 AND K15 ARE ENGAGED, OR TWO OR ALL OF K14, B11 AND B13 ARE ENGAGED
(*3) THREE OR ALL OF THESE MEMBERS ARE ENGAGED

| | CLUTCHES | | | | | BRAKES | |
|---|---|---|---|---|---|---|---|
| | K11 | K12 | K13 | K14 | K15 | B11 | B12 |
| 1st | ○ | × | × | ○ | ○ | ○ | × |
| 2nd | ○ | ×*1 | × | ×*1 | ○*1 | ○ | ○*1 |
| 3rd | ○ | ×*2 | ○ | ×*2 | ○*2 | ○ | × |
| 4th | ○*3 | ○*3 | ○*3 | ○ | ○*3 | × | × |
| 5th | × | ○ | ○ | ○ | × | × | ○ |
| Rev | × | ○ | ○ | ○ | ○ | × | × |
| 2.5th | ○ | × | × | ○ | ○ | × | ○ |
| 2.5th | ○ | × | ○ | ○ | × | × | ○ |

(*1) K15 AND B12, OR K12 AND K14 ARE ENGAGED
(*2) ONE OR BOTH OF K12 AND K15, OR K14 IS/ARE ENGAGED
(*3) THREE OR ALL OF THESE CLUTCHES ARE ENGAGED

|  | CLUTCHES | | | | | BRAKES | | |
|---|---|---|---|---|---|---|---|---|
|  | K12 | K13 | K14 | K15 | K16 | B11 | B12 | B13 |
| 1st | × | × | ×* | ○ | ○ | ○* | × | ○* |
| 2nd | ×*1 | × | ×*1 | ×*1 | ○ | ×*1 | ×*1 | ×*1 |
| 3rd | ×*2 | ○ | ×*2 | ○*2 | ○ | ○*2 | × | ×*2 |
| 4th | ○*3 | ○*3 | ○ | ○*3 | ○*3 | × | × | × |
| 5th | ○ | ○ | ○ | × | × | × | ○ | × |
| Rev | × | ○ | ×* | ○ | × | ○* | × | ○* |
| 2.5th | × | × | ○ | ○ | ○ | × | ○ | × |
| 3.5th | × | ○ | ○ | × | ○ | × | ○ | × |

(*) TWO OR ALL OF THESE MEMBERS ARE ENGAGED
(*1) K15, B11 AND B12, OR TWO OR MORE OF K12, K14, B11 AND B13 ARE ENGAGED
(*2) B11 AND ONE OR BOTH OF K12 AND K15, OR TWO OR ALL OF K14, B11 AND B13 ARE ENGAGED
(*3) THREE OR ALL OF THESE CLUTCHES ARE ENGAGED

|  | CLUTCHES | | | | | BRAKES | | | |
|---|---|---|---|---|---|---|---|---|---|
|  | K11 | K12 | K13 | K14 | K15 | B11 | B12 | B13 | B14 |
| 1st | O | × | × | ×* | O | O* | × | O* | × |
| 2nd | O | ×* | × | ×* | O* | O* | ×* | ×* | O* |
| 3rd | O | × | O | ×* | O* | O | × | × | × |
| 4th | O* | O* | O* | O* | O | × | × | × | × |
| 5th | O | O | O | O | × | × | O | × | × |
| Rev | × | × | O | ×* | O | O* | × | O* | × |
| 2.5th | O | × | × | O | ×* | × | O* | × | O* |
| 3.5th | O | × | O | O | × | × | O | × | × |

(*) TWO OR MORE COMBINATIONS OF ENGAGEMENT OF THESE MEMBERS ARE AVAILABLE FOR EACH SPEED POSITION

FIG.26.

| | K11 | K12 | K13 | K14 | K15 | B11 | B12 | B13 | B14 |
|---|---|---|---|---|---|---|---|---|---|
| 1st | O | | | O | O | O | | * | |
| | O | | | O | O | * | | O | |
| | O | | | * | O | O | | O | |
| 2nd | O | O | | O | | O | | * | * |
| | O | O | | O | | * | | O | * |
| | O | O | | O | | * | | * | O |
| | O | O | | * | | O | | O | * |
| | O | * | | * | | O | | * | O |
| | O | * | | O | | * | | O | O |
| | O | | | | O | O | O | | * |
| | O | | | | * | O | * | | O |
| 2.5th | O | | | O | O | | * | | O |
| | O | | | O | O | | O | | * |
| | O | | | O | * | | O | | O |
| 3rd | O | * | O | | * | O | | | |
| | O | O | * | | O | O | | | |
| | * | O | O | | O | O | | | |
| | O | | O | | | O | * | | |
| | O | | O | * | | O | | * | |
| | O | | O | O | | * | | O | |
| 3.5th | O | | | O | O | | O | | |
| 4th | O | O | O | O | * | | | | |
| | O | O | * | O | O | | | | |
| | O | * | O | O | O | | | | |
| | * | O | O | O | O | | | | |
| 5th | | O | O | O | | | O | | |
| Rev | | | O | O | O | O | | * | |
| | | | O | O | O | * | | O | |
| | | | O | * | O | O | | O | |

| | CLUTCHES | | | | | | BRAKES | | | | | | | |
|---|---|---|---|---|---|---|---|---|---|---|---|---|---|---|
| | K11 | K12 | K13 | K14 | K15 | | B11 | | B12 | | | B13 | |
| | | | | | 21 | 22 | 31 | 32 | 50 | 51 | 52 | 41 | 42 |
| 1st | ○ | × | × | × | ◎ | ○ | ◎ | ○ | × | × | × | × | ○ |
| 2nd | ○ | × | × | × | ◎ | ○ | ◎ | ○ | ◎ | ○ | ○ | × | × |
| 3rd | ○ | × | ○ | × | ○ | × | ◎ | ○ | × | ○ | × | × | × |
| 4th a | ○ | × | ○ | ○ | ○ | × | × | × | × | ○ | × | × | × |
| 4th b | ○ | ○ | ○ | ○ | ○ | × | × | × | × | ○ | × | × | × |
| 4th c | × | ○ | ○ | ○ | ◎ | ○ | × | × | × | ○ | × | × | × |
| 5th | × | ○ | ○ | ○ | × | × | × | × | ○ | ○ | × | × | × |
| Rev | × | × | ○ | × | ○ | × | ○ | × | × | × | × | ○ | × |
| 2.5th | ○ | × | × | ○ | ◎ | ○ | × | × | ◎ | ○ | ○ | × | × |
| 3.5th | ○ | × | ○ | ○ | × | × | × | × | ◎ | ○ | ○ | × | × |

| | CLUTCHES | | | | | | BRAKES | | | |
|---|---|---|---|---|---|---|---|---|---|---|
| | K11 | K12 | K13 | K14 | K15 | | B11 | | B12 | B13 | B14 |
| | | | | | 21 | 22 | 31 | 32 | | | |
| 1st | ○ | × | × | × | ◎ | ○ | ◎ | ○ | × | ○ | × |
| 2nd a | ○ | × | × | × | × | × | ◎ | ○ | × | ○ | ○ |
| b | ○ | × | × | × | ○ | × | ◎ | ○ | ○ | × | ○ |
| c | ○ | × | × | × | ◎ | ○ | ◎ | ○ | ○ | × | × |
| 3rd a | ○ | × | ○ | × | × | × | ◎ | ○ | ○ | × | × |
| b | ○ | × | ○ | × | ○ | × | ◎ | ○ | × | × | × |
| 4th a | ○ | × | ○ | ○ | ○ | × | × | × | × | × | × |
| b | ○ | ○ | ○ | ○ | ○ | × | × | × | × | × | × |
| c | × | ○ | ○ | ○ | ◎ | ○ | × | × | ○ | × | × |
| 5th | × | ○ | ○ | ○ | × | × | × | × | ○ | × | × |
| Rev | × | × | ○ | × | ○ | ○ | × | × | × | ○ | × |
| 2.5th | ○ | × | × | ○ | ◎ | ○ | × | × | ○ | × | × |
| 3.5th | ○ | × | ○ | ○ | × | × | × | × | ○ | × | × |

| | | CLUTCHES | | | | | BRAKES | | | | | | |
|---|---|---|---|---|---|---|---|---|---|---|---|---|---|
| | | K11 | K12 | K13 | K14 | K15 | | B11 | | B12 | | | B13 | B14 |
| | | | | | | 21 | 22 | 31 | 32 | 50 | 51 | 52 | | |
| 1st | | ○ | × | × | × | ◎ | ○ | ◎ | ○ | × | × | × | ○ | × |
| 2nd | a | ○ | × | × | × | × | × | ◎ | ○ | × | × | × | ○ | ○ |
| | b | ○ | × | × | × | ○ | × | ◎ | ○ | ○ | × | × | × | ○ |
| | c | ○ | × | × | × | ○ | × | ◎ | ○ | ◎ | ○ | ○ | × | × |
| 3rd | | ○ | × | ○ | × | ○ | × | ◎ | ○ | × | ○ | × | × | × |
| 4th | a | ○ | × | ○ | ○ | ○ | × | × | × | × | ○ | × | × | × |
| | b | ○ | ○ | ○ | ○ | ○ | × | × | × | × | ○ | × | × | × |
| | c | × | ○ | ○ | ○ | ◎ | ○ | × | × | × | ○ | × | × | × |
| 5th | | × | ○ | ○ | ○ | × | × | × | × | ○ | ○ | × | × | × |
| Rev | | × | × | ○ | × | ○ | × | ○ | × | × | × | × | ○ | × |
| 2.5th | | ○ | × | × | ○ | ◎ | ○ | × | × | ◎ | ○ | ○ | × | × |
| 3.5th | | ○ | × | ○ | × | × | × | × | × | ◎ | ○ | ○ | × | × |

| | | CLUTCHES | | | | | | | BRAKES | | |
|---|---|---|---|---|---|---|---|---|---|---|---|
| | | K11 | K12 | K13 | K14 | | K15 | | B11 | B12 | B13 |
| | | | | | 11 | 12 | 21 | 22 | 31 | 32 | | |
| 1st | a | ○ | × | × | ◎ | ○ | ◎ | ○ | ◎ | ○ | × | ○ |
| | b | ○ | × | × | ◎ | ○ | ◎ | ○ | ◎ | ○ | × | × |
| 2nd | | ○ | × | × | × | × | ◎ | ○ | ◎ | ○ | ○ | × |
| 3rd | a | ○ | × | ○ | × | × | × | × | ◎ | ○ | ○ | × |
| | b | ○ | × | ○ | × | × | ○ | × | ◎ | ○ | × | × |
| 4th | a | ○ | × | ○ | ○ | × | ○ | × | × | × | × | × |
| | b | ○ | ○ | ○ | ○ | × | ○ | × | × | × | × | × |
| | c | × | ○ | ○ | ○ | × | ◎ | ○ | × | × | × | × |
| 5th | | × | ○ | ○ | ○ | × | × | × | × | × | ○ | × |
| Rev | | × | × | ○ | × | ○ | ○ | × | ○ | × | × | ○ |
| 2.5th | | ○ | × | × | ○ | × | ◎ | ○ | × | × | ○ | × |
| 3.5th | | ○ | × | ○ | ○ | × | × | × | × | × | ○ | × |

| | CLUTCHES | | | | | | BRAKES | | | | |
|---|---|---|---|---|---|---|---|---|---|---|---|
| | K11 | K12 | K13 | K14 | K15 | | B11 | | B12 | B13 | |
| | | | | | 21 | 22 | 31 | 32 | | 41 | 42 |
| 1st | O | × | × | × | ◎ | O | ◎ | O | × | ◎ | O |
| 2nd | O | × | × | × | ◎ | O | ◎ | O | O | × | × |
| 3rd a | O | × | O | × | × | × | ◎ | O | O | × | × |
| b | O | × | O | × | O | × | ◎ | O | × | × | × |
| 4th a | O | × | O | O | O | × | × | × | × | × | × |
| b | O | O | O | O | O | × | × | × | × | × | × |
| c | × | O | O | O | ◎ | O | × | × | × | × | × |
| 5th | × | O | O | O | × | × | × | × | O | × | × |
| Rev | × | × | O | × | O | × | O | × | × | O | × |
| 2.5th | O | × | × | O | ◎ | O | × | × | O | × | × |
| 3.5th | O | × | O | O | × | × | × | × | O | × | × |

| | | CLUTCHES | | | | | BRAKES | | | |
|---|---|---|---|---|---|---|---|---|---|---|
| | | K11 | K12 | K13 | K14 | K15 | | B11 | | B12 | B13 |
| | | | | | | | 21 | 22 | 31 | 32 | | |
| 1st | | O | × | × | ◎ | ◎ | O | ◎ | O | × | O |
| 2nd | | O | × | × | × | ◎ | O | ◎ | O | O | × |
| 3rd | a | O | × | O | × | × | × | ◎ | O | O | × |
| | b | O | × | O | × | O | × | ◎ | O | × | × |
| 4th | a | O | × | O | O | O | O | × | × | × | × |
| | b | O | O | O | O | O | × | × | × | × | × |
| | c | × | O | O | O | ◎ | O | × | × | × | × |
| 5th | | × | O | O | O | × | × | × | × | O | × |
| Rev | | × | × | O | O | O | × | O | × | × | × |
| 2.5th | | O | × | × | O | ◎ | O | × | × | O | × |
| 3.5th | | O | × | O | O | × | × | × | × | O | × |

|  | | CLUTCHES | | | | | BRAKES | | | |
|---|---|---|---|---|---|---|---|---|---|---|
|  | | K11 | K12 | K13 | K14 | K15 | B11 | B12 | B13 | B14 |
|  | | | | | | 21 \| 22 | 31 \| 32 | | | 61 \| 62 |
| 1st | | ○ | × | × | × | ◎ \| ○ | ◎ \| ○ | × | ○ | × \| × |
| 2nd | a | ○ | ◎ | × | × | × \| × | ◎ \| ○ | × | ○ | ○ \| ○ |
|  | b | ○ | × | × | × | ○ \| × | ◎ \| ○ | ◎ | × | ○ \| ○ |
| 3rd | | ○ | × | ○ | × | ○ \| × | ◎ \| ○ | × | × | ○ \| × |
| 4th | a | ○ | × | ○ | ○ | ○ \| ○ | × \| × | × | × | ○ \| × |
|  | b | ○ | ○ | ○ | ○ | ○ \| × | × \| × | × | × | ○ \| × |
|  | c | × | ○ | ○ | ○ | ◎ \| ○ | × \| × | × | × | ○ \| × |
| 5th | | × | ○ | ○ | ○ | × \| × | × \| × | ○ | × | ○ \| × |
| Rev | | × | × | ○ | × | ○ \| ○ | ○ \| × | × | ○ | × \| × |
| 2.5th | | ○ | × | × | ○ | ◎ \| ○ | × \| × | × | ○ | ○ \| × |
| 3.5th | | ○ | × | ○ | ○ | × \| × | × \| × | ○ | × | ○ \| × |

AUTOMATIC PLANETARY GEAR TRANSMISSION

| Inventor | Appln. No. |
|---|---|
| Asada et al | 07/439,607 |
| Asada | 07/437,838 |
| Nakawaki et al | 07/460,998 |
| Asada | 07/439,699 |

BACKGROUND OF THE INVENTION

1. Field of the Invention

The present invention relates in general to a speed changing gear device in an automatic transmission for motor vehicles such as automobiles, and more particularly to such a speed changing gear device which is equipped with two single-pinion type planetary gear units and one double-pinion type planetary gear unit.

2. Discussion of the Prior Art

An automatic transmission for a motor vehicle is constructed to automatically establish one of a plurality of operating positions which has an optimum speed reduction ratio, depending upon the current speed and load of the motor vehicle. Owing to substantial freedom from manipulation by the vehicle operator, such an automatic transmission is widely used for recently marketed automobiles. Examples of such a vehicle automatic transmission are disclosed in laid-open Publication Nos. 50-32913 and 51-3012 of examined Japanese Patent Applications, wherein three planetary gear units are disposed in series so as to constitute a speed changing gear device. These automatic transmissions are relatively simple in construction, and provide five forward drive positions having respective speed reduction ratios, permitting stepwise speed changes over a relatively wide range of speed reduction ratio (that is, a relatively high ratio of the highest reduction ratio to the lowest reduction ratio). Further, the planetary gear units of the speed changing gear device may have suitable gear ratios (ratio of the number of teeth of the sun gear to that of the ring gear of each gear unit), without having to increase the size of the speed changing gear device. These are some of the advantages of the automatic transmissions having planetary gear units as disclosed in the above-identified publications.

However, the conventional speed changing gear device as used in the known automatic transmission indicated above requires disconnection of one element of the gear device from the input or driven shaft of the transmission, and connection of another element to the input shaft, when the transmission is shifted up from the 2nd-speed position to the 3rd-speed position, from the 1st-speed position to the 2nd-speed position. These disconnection and connection make it difficult to control the speed changing gear device for smooth shifting actions. Described more specifically, there may arise some no-load time interval between the moment of disconnection of one element from the input shaft, and the moment of connection of another element to the input shaft. This no-load time interval results in racing of the vehicle engine, since the input shaft of the transmission is not connected to any of the elements of the speed changing gear device. If the input shaft is connected simultaneously to the two elements of the gear unit for some time, on the other hand, there may arise some shifting shock upon the relevant shifting action of the transmission. Thus, the conventional speed changing gear device requires intricate regulation of the timings at which the transmission input shaft is released from one element of the gear device and newly coupled to another element of the gear device. This problem is conspicuous where a shifting action of the gear device takes place while the engine speed is relatively high, namely, where the shifting action is associated with the 1st-speed, 2nd-speed and 3rd-speed positions which have relatively high speed reduction ratios.

SUMMARY OF THE INVENTION

It is accordingly an object of the present invention to provide a speed changing gear device for a vehicle automatic transmission, which does not require substantially concurrent disconnection and connection of the vehicle input shaft from and to respective elements of the planetary gear units, upon shifting of the transmission between relatively low-gear positions having high speed reduction ratios.

The above object may be achieved according to the principle of the present invention, which provides a speed changing gear device for an automatic transmission, including a single-pinion type first planetary gear unit having a first sun gear, a first planetary pinion meshing with the first sun gear, a first ring gear meshing with the first planetary pinion, and a first carrier rotatably supporting the first planetary pinion, a single-pinion type second planetary gear unit having a second sun gear, a second planetary pinion meshing with the second sun gear, a second ring gear meshing with the second planetary pinion, and a first carrier rotatably supporting the second planetary pinion, and a double-pinion type third planetary gear unit having a third sun gear, at least one pair of third planetary pinions which mesh with each other and one of which meshes with the third sun gear, a third ring gear meshing with the other of the at least one pair of third planetary pinions, and a third carrier rotatably supporting the at least one pair of third planetary pinions, the first, second and third planetary gear units cooperating with each other to transmit power from an input member of the transmission to an output member of the transmission, at a selected one of different speed reduction ratios in either forward or reverse driving of the vehicle, the present speed changing gear device being characterized in that the sun gears of the first and second planetary gear units are fixed to each other, or connectable to each other through clutch means, that the carrier of the first planetary gear unit, the ring gear of the second planetary gear unit and the carrier of the third planetary gear unit are fixed to each other or connectable to each other through clutch means, and that the carrier of the second planetary gear unit and the sun gear of the third planetary gear unit are fixed to each other or connectable to each other through clutch means.

Where the two elements indicated above are fixed to each other, these two elements may be separate members secured to each other by a suitable method. Alternatively, the two elements may be formed as a single integral member which attains two functions corresponding to the two elements. In the latter case, too, the two elements are interpreted to be fixed to each other by fixing means, according to the principle of the present invention. The clutch means indicated above may be a clutch which is engaged for selectively connecting the appropriate two elements indicated above.

In the speed changing device of the present invention constructed as described above, the sun gears of the first and second planetary gear units are always or momentarily rotated or held stationary as a unit, or rotated or held stationary independently of each other, thereby serving as an integral stationary element, separate stationary elements, an integral input element or separate input elements which is/are connected to the input member, or an integral output element or separate output elements which is/are connected to the output member. Similarly, the carriers of the first and third planetary gear units and the ring gear of the second planetary gear unit serve as the integral stationary element or separate stationary elements, the integral input element or separate input elements, or the integral output element or separate output elements. Further, the carrier of the second planetary gear unit and the carrier of the third planetary gear unit serve as the integral stationary element or separate stationary elements, or the integral input or output element or separate input or output elements. Each of the independent elements of the speed changing gear device, such as the ring gears of the first and third planetary gear units, serves as an independent stationary, input or output element of the device. Thus, the individual elements of the speed changing gear device operate as integral, mutually connectable or independent elements, to transmit a rotary motion of the input member of the transmission to the output member, at the different speed reduction ratios (which may include direct drive and/or overdrive ratio or ratios), for forward or reverse running of the vehicle.

The present speed changing gear device incorporating the two single-pinion type planetary gear units and the one double-pinion type planetary gear unit provides a relatively large number of forward drive positions, e.g., five to seven forward drive speed positions, with a relatively small number of coupling elements or means. Where five forward drive positions are provided, the speed reduction ratios of the five positions may be determined so as to vary substantially in the form of a geometric progression, with desired or suitable gear ratios of the individual planetary gear units which may be obtained without increasing the size of the gear units. Further, none of the shifting operations requires disconnection of one input element from the input member of the transmission and connection of another input element to the input member. Thus, the speed changing gear device according to the present invention gives a compact automatic transmission which is comparatively easy to control and which displays improved power transmitting characteristics, with reduced shifting shocks or engine racing.

BRIEF DESCRIPTION OF THE DRAWINGS

The above and optional objects, features and advantages of the present invention will become more apparent by reading the following detailed description of presently preferred various embodiments of the invention, taken in connection with the accompanying drawings, in which:

FIGS. 1A–17A, 18–24 and 25A are schematic views showing different embodiments of the speed changing gear device of the present invention;

FIGS. 1B and 15B are views indicating the operating states of individual clutches and brakes in relation to the operating positions of the speed changing devices of FIGS. 1A and 15A, respectively, together with the speed reduction ratios of the devices;

FIGS. 2B–17B and 25B are views indicating the operating states of the clutches and brakes of the speed changing gear devices of FIGS. 2A–17A and 25A, respectively;

FIG. 26 is a view indicating in detail possible combinations of engagement of the clutches and brakes for each of the operating positions of the speed changing gear device of FIG. 25;

FIGS. 38A–44A are schematic views showing further embodiments of the invention; and FIGS. 38B–44B are views indicating the operating states of the clutches and brakes of the embodiments of FIGS. 38A–44A, respectively.

DETAILED DESCRIPTION OF THE PREFERRED EMBODIMENTS

As summarized above, the appropriate elements of the planetary gear units are fixed together or connectable to each other by suitable coupling or clutch means. Further, the appropriate elements of the gear units are connectable to the input or output member of the transmission through clutch means, or held stationary by braking means when needed. The input and output elements which are momentarily or permanently connected to the input and output members of the transmission may be suitably selected.

FIGS. 1A–14A, there are illustrated various embodiments of the speed changing device of this invention, in which the input member is fixed or selectively connectable to the ring gear of the first planetary gear unit, and may be selectively connectable to the ring gear of the third planetary gear unit, while the output shaft is fixed to the carrier of the third planetary gear unit.

Figure 1A:
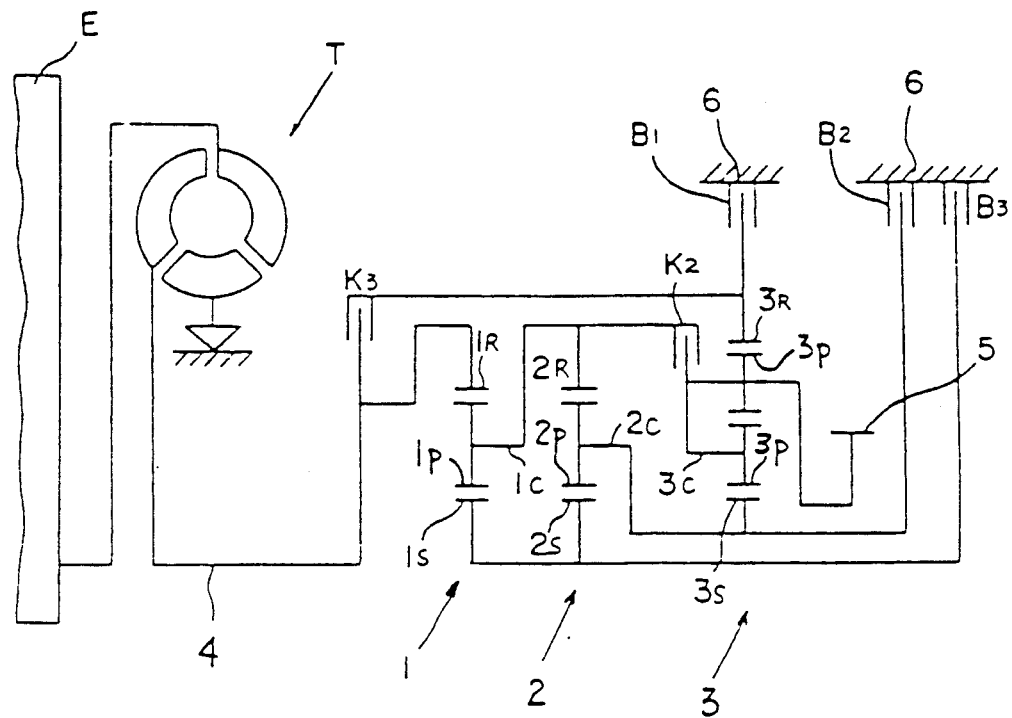

In FIG. 1A, there is shown the first embodiment of the speed changing device of the present invention, wherein the input member of the transmission is fixed to the ring gear of the first planetary gear unit and is selectively connectable to the ring gear of the third planetary gear unit, while the output member of the transmission is fixed to the carrier of the third planetary gear unit for rotation as a unit.

In FIG. 1, only the upper half of the automatic transmission incorporating the speed changing gear device is shown in the interest of brevity, since the construction of the transmission is symmetric with respect to its axis of rotation. The speed changing gear device incorporates a first, a second and a third planetary gear unit 1, 2, 3, which are disposed in series coaxially with each other, and with the input and output members in the form of an input shaft 4 and an output shaft 5. The first planetary gear unit 1 is a single-pinion type planetary gear set whose major elements consist of a first sun gear 1S, a first planetary pinion 1P meshing with the first sun gear 1S, a first ring gear 1R coaxial with the first sun gear 1S and meshing with the first planetary pinion 1P, and a first carrier 1C rotatably supporting the first planetary pinion 1P. The second planetary gear unit 2 is also a single-pinion type planetary gear set whose major elements consist of a second sun gear 2S, a second planetary pinion 2P meshing with the second sun gear 2S, a second ring gear 2R coaxial with the second sun gear 2S and meshing with the second planetary pinion 2P, and a second carrier rotatably supporting the second planetary pinion 2P. The third planetary gear unit 3 is a double-pinion type planetary gear set whose major elements consist of a third sun gear 3S, a pair of mutually meshing planetary pinions 3P meshing with the third sun gear 3S, a third ring gear 3R coaxial with the third sun gear 3S and meshing with the third planetary pinions 3P, and a third carrier 3C disposed between the third sun and ring gears 3S, 3R for rotatably supporting the planetary pinions 3P. The third planetary gear unit 3 may incorporate two or more pairs of planetary pinions 3P.

The elements of these three planetary gear units 1, 2, 3 are connected to each other in the following manner. Namely, the first and second sun gears 1S, 2S of the first and second planetary gear units 1, 2 are integrally fixed to each other for rotation as a unit, while the first carrier 1C of the first planetary gear unit 1 and the second ring gear 2R of the second planetary gear unit 2 are integrally fixed to each other for rotation as a unit. Further, a second clutch K2 is provided between the integral first carrier 1C and ring gear 2R, and the third carrier 3C of the third planetary gear unit 3, while the second carrier 2C of the second planetary gear unit 2 and the third sun gear 3S of the third planetary gear unit 3 are integrally fixed to each other for rotation as a unit.

Means for integrally fixing the elements together as indicated above may be a suitable hollow or solid shaft or a suitable connecting drum usually employed in an ordinary automatic transmission for fixing functionally different elements for rotation as a unit.

The input shaft 4 is connected to an engine E of a motor vehicle through suitable power transmitting means T such as a torque converter or fluid coupling. This input shaft 4 is integrally fixed to the first ring gear 1R, and is selectively connectable to the third ring gear 3R through a third clutch K3 disposed therebetween.

The second and third clutches K2 and K3 function to selectively connect the appropriate two elements of the speed changing gear device, i.e., are engaged for connection of the appropriate two elements when needed, and are disengaged for disconnection of the two elements from each other. For example, the clutches K2, K3 may be a wet-type multiple-disk clutch, a one-way clutch, or a combination of a wet-type multiple-disk clutch and a one-way clutch, which are operated by suitable actuators such as a hydraulic servo unit generally employed for known automatic transmissions. In the third case, the multiple-disk clutch and the one-way clutch may be disposed in series or parallel with each other. In practice, a suitable intermediate member such as a connecting drum is used for operatively associating the appropriate two elements of the device with the clutches K2, K3, since there are actually more or less restrictions in locating the clutches in the speed changing device.

For selectively locking or holding stationary the ring gear 3R of the third planetary gear unit 3, there is provided a first brake B1 between the third ring gear 3R and a stationary transmission casing (hereinafter referred to simply as "casing") 6. Between this casing 6, and the second carrier 2R and the third sun gear 3S integrally fixed together, there is disposed a second brake B2 so that the integral body 2R, 3S is held selectively stationary while being fixed to the casing 6 by the second brake B2. Further, a third brake B3 is provided between the casing 6, and the first and second sun gears 1S and 2S integrally fixed together, so that the integral body 1S, 2S is selectively held stationary while being fixed to the casing 6 by the third brake B3.

These first, second and third brakes B1, B2, B3 may be a wet-type multiple-disk brake, a band brake, or a one-way clutch, or a combination of these frictional coupling components, and may be operated by suitable actuators such as a hydraulic servo unit generally employed for known automatic transmissions. Certainly, there are provided suitable connecting members as described above with respect to the clutches K2, K3, between each brake B1, B2, B3 and the elements that are braked by the brakes B1-B3, or between the brake and the casing 6.

The output shaft 5 is operatively connected to a propeller shaft or counter gear (not shown) of the power transmitting system of the relevant motor vehicle. This output shaft 5 is fixed to the carrier 3C of the third planetary gear unit 3.

The present speed changing gear device of FIG. 1A constructed as described above provides a total of six forward drive positions (1st-speed, 2nd-speed, 3rd-speed, 4th-speed, 5th-speed, and 6th-speed positions), and one rear drive position (Rev.). These operating positions of the gear device are established by concurrent engagement of the members selected from among the two clutches K2, K3 and three brakes B1, B2, B3, as indicated in the table of FIG. 1B. In the table, the engaged clutch or clutches and brake or brakes are indicated by "o" marks, while the disengaged clutch or clutches and brake or brakes are indicated by "x" marks. The table also indicates the speed reduction ratios of each operating position of the speed changing gear device, where gear ratios $\rho_1$, $\rho_2$, $\rho_3$ of the first, second and third planetary gear units 1, 2, 3 are 0.312, 0.385 and 0.443, respectively. There will be described each of the seven operating positions of the instant speed changing gear device.

1ST-SPEED POSITION

The second clutch K2 is engaged to connect the third carrier 3C to the first carrier 1C and second ring gear 2R, while the first brake B1 is engaged to fix the third ring gear 3R to the casing 6. Consequently, the ring gear 1R of the first planetary gear unit 1 is rotated with the input shaft 4 while a load is applied from the output shaft 5 to the carrier 1C, whereby the first sun gear 1S is rotated in the reverse direction opposite to the direction of rotation of the input shaft 4, and therefore the second sun gear 2S integral with the first sun gear 1S is rotated in the same reverse direction. The term "reverse direction" will be hereinafter used to indicate the direction opposite to the rotating direction of the input shaft 4. In the second planetary gear unit 2, the load is applied from the output shaft 5 to the second ring gear 2R, and the sun gear 2S is rotated in the reverse direction to rotate the second carrier 2C in the reverse direction at a speed lower than that of the second sun gear 2S. The rotary motion of the second carrier 2C is imparted to the sun gear 3S of the third planetary gear unit 3. As a result, the third sun gear 3S is rotated in the reverse direction with the third ring gear 3R held stationary, whereby the third carrier 3C is rotated in the forward direction, i.e., in the same direction as the input shaft 4. The term "forward direction" will be hereinafter used to indicate the direction in which the input shaft 4 is rotated. Since the third carrier 1C and the second ring gear 2R are fixed together and are currently connected to the third carrier 3C by the second clutch K2, the first ring gear 1R is eventually rotated with the input shaft 4, while the first carrier 1C is rotated at a relatively low speed in the forward direction and the first sun gear 1S is rotated in the reverse direction. In the second planetary gear unit 2, the second carrier 2C is rotated at a low speed in the reverse direction as the second sun gear 2S is rotated in the same direction, while the second ring gear 2R is rotated at a low speed in the forward direction. As a result, the rotation of the input shaft 4 is transmitted through the first, second and third planetary gear units 1, 2, 3 to the output shaft 5 such that the output shaft 5 is rotated in the forward direction at the speed reduction ratio of $\{\rho_1(1+\rho_2)+\rho_2\rho_3\}/\rho_2\rho_3$, which is equal to 3.534 as indicated in FIG. 1B. In the 1st-speed position, no circulation of power will occur.

2ND-SPEED POSITION

The second clutch K2 is engaged to connect the third carrier 3C to the first carrier 1C and second ring gear 2R, while the second brake B2 is engaged to fix the second carrier 2C and third sun gear 3C to the casing 6. In other words, the 2nd-speed position is established by releasing the first brake B1 and engaging the second brake B2 while the speed changing gear device is placed in the 1st-speed position Consequently, the first sun gear 1S is rotated in the reverse direction while the load is applied from the output shaft 5 to the carrier 1C, with the first ring gear 1R rotating with the input shaft 4. The rotation of the first sun gear 1S is imparted to the second sun gear 2S. In the second planetary gear unit 2, the second carrier 2C is fixed, and the second sun gear 2S is rotated in the reverse direction, whereby the second ring gear 2R is rotated in the forward direction. As a result, the output shaft 5 connected to the first carrier 1C and second ring gear 2R is rotated in the forward direction, at a reduced speed as compared with the speed of the input shaft 4. In this 2nd-speed position, the ring gear 3R of the third planetary gear unit 3 is not fixed to the casing 6 and not connected to the input shaft 4, and therefore the third planetary gear unit 3 does not contribute to a speed changing action. Therefore, the speed reduction ratio of the 2nd-speed position is represented by $(\rho_1+\rho_2+\rho_1\rho_2)/\rho_2$, which is equal to 2.122 as indicated in the table of FIG. 1B. In this case, too, no circulation of power will occur.

3RD-SPEED POSITION

The second clutch K2 is engaged to connect the third carrier 3C to the first carrier 1C and second ring gear 2R, while the third brake B3 is engaged to fix the first and second sun gear 1S, 2S to the casing 6. In other words, the 3rd-speed position is established by releasing the second brake B2 and engaging the third brake B3 while the speed changing device is placed in the 2nd-speed position. Consequently, the carrier 1C is rotated in the forward direction at a reduced speed as compared with that of the input shaft 4, while the first ring gear 1R is rotated with the input shaft 4, with the first sun gear 1S held stationary. The rotary motion of the first carrier 1C is consequently imparted to the output shaft 5. In this 3rd-speed position, too, the third planetary gear unit 3 does not contribute to a speed changing action, since the third ring gear 3R is not fixed to the casing 6 and not connected to the input shaft 4, although the third sun gear 3S is fixed to the second carrier 2C. Consequently, the second planetary gear unit 2 does not contribute to the speed changing action, either. Therefore, the speed reduction ratio of the 3rd-speed position is practically established by the first planetary gear 1 only, and is represented by $(1+\rho_1)$, which is equal to 1.312 as indicated in FIG. 1B. In this case, too, no circulation of power will occur.

4TH-SPEED POSITION

The second clutch K2 is engaged to connect the third carrier 3C to the first carrier 1C and second ring gear 2R, as in the 1st-, 2-nd and 3rd-speed positions, while the third clutch K3 is engaged to connect the third ring gear 3R to the input shaft 4. Consequently, the first and third ring gears 1R, 3R are both connected to the input shaft 4. In other words, the 4th-speed position is established by releasing the third brake B3 and engaging the third clutch K3 while the speed changing device is placed in the 3rd-speed position. In the 4th-speed position, therefore, the rotation of the input shaft 4 is applied to the device through the first and third ring gears 1R, 3R, and all of the first, second and third brakes B1-B3 are released or placed in the disengaged state, whereby the power transmission occurs with the gear train of the device as a whole rotating as a unit. Thus, the 4th-speed position provides the speed reduction ratio of 1, and may be referred to as "direct drive" position, when appropriate.

5TH-SPEED POSITION

The third clutch K3 is engaged to connect the third ring gear 3R to the input shaft 4, while the third brake B3 is engaged to fix the first and second sun gears 1S, 2S to the casing 6. In other words, the 5th-speed position is established by releasing the second clutch K2 and engaging the third brake B3 while the device is placed in the 4th-speed position. Consequently, the first ring gear 1R is rotated with the input shaft 4, with the first sun gear 1S held stationary, whereby the first carrier 1C is rotated in the forward direction at a lower speed than the input shaft 4. The rotation of the first carrier 1C is imparted to the second ring gear 2R. In the second planetary gear unit 2, the second sun gear 2S is held stationary, while the second ring gear 2R is rotated in the forward direction at a speed lower than that of the input shaft 4, whereby the second carrier 2C is rotated in the forward direction at a speed lower than that of the second ring gear 2R. The rotation of the second carrier 2C is imparted to the sun gear 3S of the third planetary gear unit 3. As a result, the third ring gear 3R is rotated with the input shaft 4, with the third sun gear 3S rotating at a lower speed in the forward direction. Consequently, the third carrier 3C is rotated in the forward direction with the output shaft at a higher speed than the input shaft. In this 5th-speed position, all of the three planetary gear units 1, 2, 3 contribute to a speed changing action to increase the speed of the output shaft 5 with respect to that of the input shaft 4. Thus, the 5th-speed position is an overdrive position which has a speed reduction ratio of $A/\{\rho_1(\rho_1+\rho_2+\rho_1\rho_2)+A\}$, where $A=(1+\rho_1)(1+\rho_2)(1-\rho_3)$. The speed reduction ratio is equal to 0.737. No circulation of power will occur in this 5th-speed position.

6TH-SPEED POSITION

The third clutch K3 is engaged to connect the third ring gear 3R to the input shaft 4, while the second brake B2 is engaged to fix the second carrier 2C and third sun gear 3S to the casing 6. In other words, the 6th-speed position is established by releasing the third brake B3 and engaging the second brake B2 while the speed changing device is placed in the 5th-speed position. In this 6th speed position, the first carrier 1C and second ring gear 2R are not connected to the third carrier 3C, and the first and second sun gears 1S, 2S are not fixed to the casing 6. Therefore, the first and second planetary gear units 1 and 2 do not contribute to a speed changing action. In the third planetary gear unit 3, on the other hand, the third ring gear 3R is rotated with the input shaft 4, with the third sun gear 3S held stationary, the third carrier 3C and the output shaft 5 fixed thereto are rotated in the forward direction at a speed higher than that of the input shaft 4. Thus, the 6th-speed position is also an overdrive position, which has a speed reduction ratio lower than that of the 5th-speed position. Since the speed changing is effected by the third planetary gear unit 3 only, the speed reduction ratio of the 6th-speed position is equal to $\rho_3$, which is 0.443 as indicated in the table of FIG. 1B. Certainly, no circulation of power will occur in the 6th-speed position. As is apparent from the speed reduction ratio, the 6th-speed position is generally infrequently used under limited running conditions of the vehicle.

REVERSE POSITION

The reverse or rear drive position is established by engaging the first brake B1 to fix the third ring gear 3R to the casing 6, and the third brake B3 to fix the first and second sun gears 1S, 2S to the casing 6. Consequently, the first ring gear 1R is rotated with the input shaft 4, with the first and second sun gears 1S, 2S held stationary, whereby the first carrier 1C is rotated in the forward direction at a reduced speed as compared with the speed of the input shaft 4. The rotation of the first carrier 1C is imparted to the second ring gear 2R. In the second planetary gear unit 2, the second ring gear 2R is rotated in the forward direction at a speed lower than that of the input shaft 4, with the second sun gear 2S held stationary, whereby the second carrier 2C is rotated in the forward direction at a speed lower than that of the second ring gear 2R. The rotation of the second carrier 2C is imparted to the third sun gear 3S. In the third planetary gear unit 3, the third sun gear 3S is rotated in the forward direction with the third ring gear 3R held stationary, and consequently the third carrier 3C is rotated with the output shaft 5, in the reverse direction. In the reverse position, therefore, the first, second and third planetary gear units 1, 2 and 3 cooperate with each other to transmit power from the input shaft 4 to the output shaft 5 such that the output shaft 5 is rotated in the reverse direction opposite to the direction of rotation of the input shaft 4, at a speed lower than that of the input shaft. The speed reduction ratio of the reverse position is represented by $-(1+\rho_1)(1+\rho_2)/(1-\rho_3)/\rho_3$, which is equal to $-2.285$ as indicated in FIG. 1B. In the reverse position, too, no circulation of power will occur.

It will be understood from the above explanation that the speed changing gear device shown in FIG. 1A has the six forward drive positions and the one reverse or rear drive position having suitable speed reduction ratios, each of the seven positions being established by concurrent engagement of only two members selected from the two clutches K2, K3 and three brakes B1–B3, without having to disengage one of the two clutches and engage the other clutch. That is, any shifting operation of the present speed changing gear device does not require substantially concurrent disconnection of one element of the device from the input member of the transmission, and connection of another element of the device to the input member. Accordingly, the present device is relatively easy to control, exhibits improved power transmitting and speed changing characteristics and efficiency, and is free from shifting shock. Further, the gear ratios of the first, second and third planetary gear units 1, 2, 3 may be suitably selected without increasing the size of the gearing train of the device. Moreover, the speed reduction ratios of the 1st-speed through 4th-speed positions may be determined to vary substantially in the form of a geometrical progression, which assures smooth shifting operations of the device. In the present device, the speeds of the planetary pinions 1P, 2P, 3P relative to those of the carriers 1C, 2C, 3C of the planetary gear units 1, 2, 3 are relatively low, assuring improved durability of the device. Furthermore, the integral connection of the first and second sun gears 1S, 2S permits these functionally different elements to be constituted by a single member, contributing to reduction in the numbers of parts and assembling steps of the speed changing device.

Figures 2A, 2B:
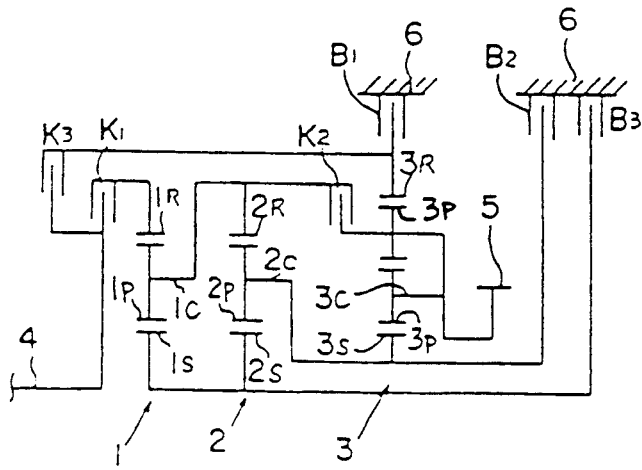

While the first embodiment of FIGS. 1A and 1B is constructed such that the ring gear 1R of the first planetary gear unit 1 is held fixed to the input shaft 4, the first ring gear 1R and the input shaft are selectively connectable to each other, as illustrated in FIG. 2A. In this embodiment, a first clutch K1 is disposed between the first ring gear 1R and the input shaft 4. The device has a 7th-speed position, in addition to the six forward drive positions described above. In the other aspects, the present embodiment is identical with the first embodiment of FIG. 1A. The operating states of the first, second and third clutches K1–K3 and the first, second and third brakes B1–B3 for each of the operating positions of the device are indicated in FIG. 2B, by way of example. As in FIG. 1A, the "o" marks indicate the engaged state of each clutch or brake, while the "x" marks indicate the disengaged or released state of the relevant clutch or brake. These symbols "o" and "x" will be used in the same sense.

Figures 3A, 3B:
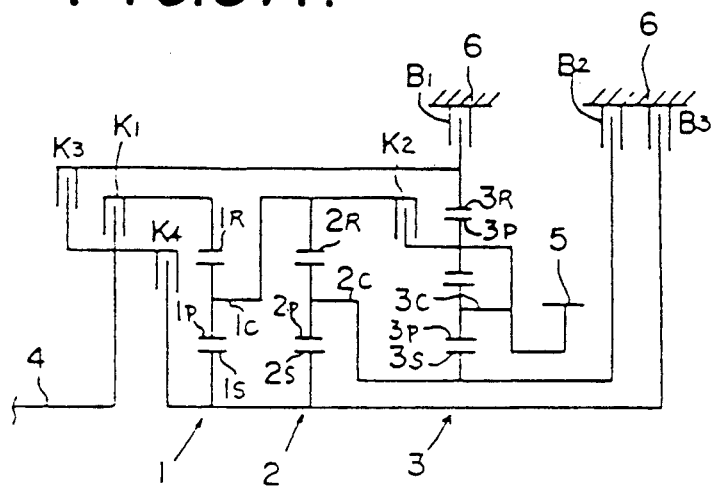

The second embodiment of FIGS. 2A and 2B may be modified as illustrated in FIG. 3A. In this third embodiment, a fourth clutch K4 is provided for selectively connecting the first and second sun gears 1S and 2S to the input shaft 4. The speed changing device of FIG. 3A has seven forward drive positions and two reverse positions, as indicated in FIG. 3B, which also indicates the operating states of the clutches and brakes, by way of example.

Figures 4A, 4B:
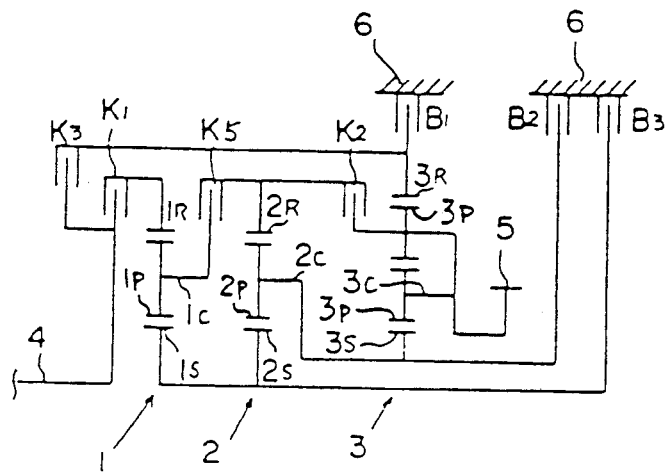

Referring to FIG. 4A, there is shown a modification of the embodiment of FIGS. 2A and 2B. In this modified embodiment, a fifth clutch K5 is disposed between the carrier 1C of the first planetary gear unit 1 and the ring gear 2R of the second planetary gear unit 2, so that the first carrier 1C and the second ring gear 2R are selectively connected to each other. In the other aspects, the present embodiment is identical with the second embodiment of FIGS. 2A and 2B. FIG. 4B indicates the operating states of the clutches K1–K3 and K5 and the brakes B1–B3, for each of the seven forward drive positions and the one reverse position of the present device, by way of example.

Figures 5A, 5B:
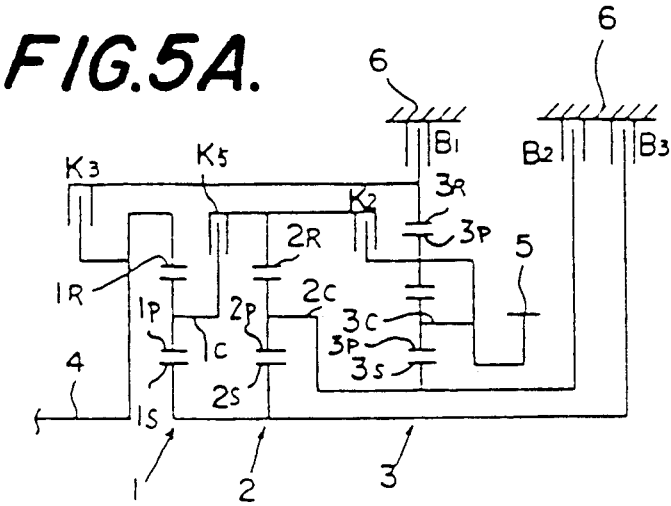

A modification of the embodiment of FIGS. 1A and 1B is illustrated in FIG. 5A. In this modified embodiment, a fifth clutch K5 is disposed as in the preceding fourth embodiment of FIGS. 4A and 4B. FIG. 5B indicates the operating states of the clutches K2, K3 and K5 and the brakes B1–B3, for each of the operating positions of the present device, by way of example.

Figures 6A, 6B:
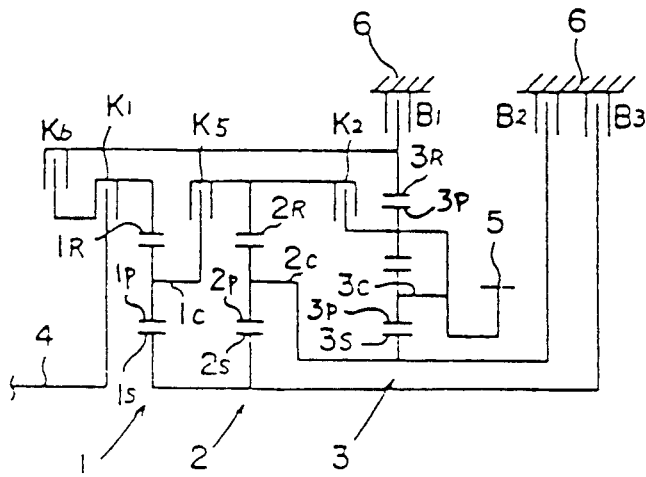

Another embodiment is illustrated in FIG. 6A, which is obtained by modifying the embodiment of FIGS. 4A and 4B, such that the third clutch K3 is replaced by a sixth clutch K6 provided to selectively connect the ring gears 1R, 3R of the first and third planetary gear units 1, 3. FIG. 6B indicates the operating states of the clutches K1, K2, K5, K6 and the brakes B1-B3 of the present device, by way of example.

Figures 7A, 7B:
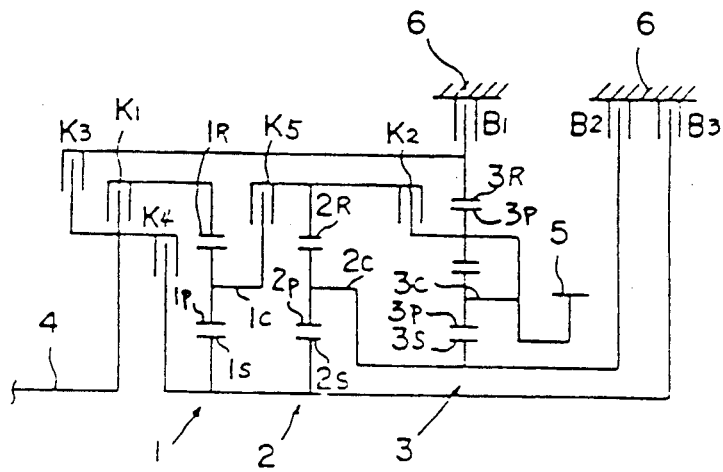

There is illustrated in FIG. 7A a further embodiment of the invention, which has the five clutches K1-K5. In other words, the present embodiment is identical with the embodiment of FIGS. 3A and 3B, except for the addition of the fifth clutch K5. FIG. 7B indicates the operating states of the clutches K1-K5 and the brakes B1-B3 of the present device, by way of example.

Figures 8A, 8B:
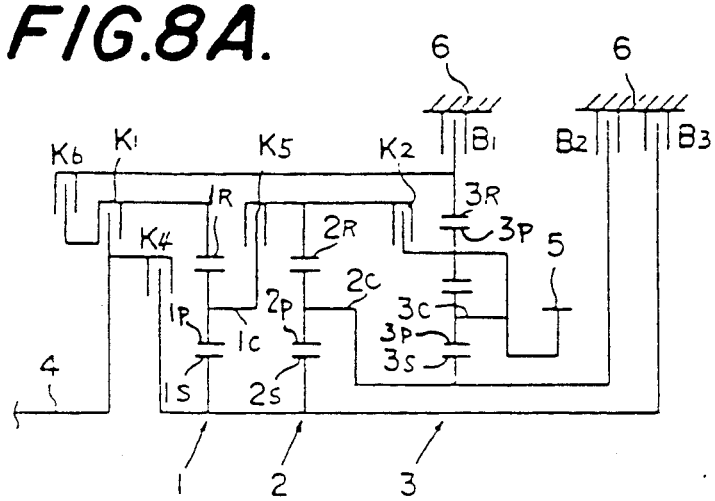

A still further embodiment of the invention is illustrated in FIG. 8A. This embodiment is identical with the embodiment of FIGS. 6A and 6B, with exceptions of the fourth clutch K4 added between the input shaft 4 and the sun gears 1S and 2S of the first and second planetary gear units 1, 2, and the five forward drive positions rather than the seven forward drive position. FIG. 8B indicates the operating states of the clutches and brakes of the present device, by way of example.

Figures 9A, 9B:
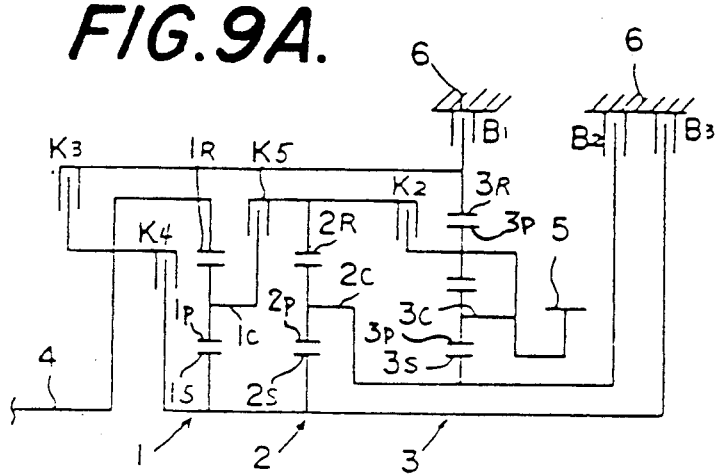

The embodiment of FIGS. 5A and 5B may be modified into a yet further embodiment as illustrated in FIG. 9A, by providing the fourth clutch K4 between the input shaft 4 and the first and second sun gears 1S, 2S. The present device has the five forward drive positions and the one reverse position as indicated in FIG. 9B, which also indicates the operating states of the clutches and brakes, by way of example.

Figures 10A, 10B:
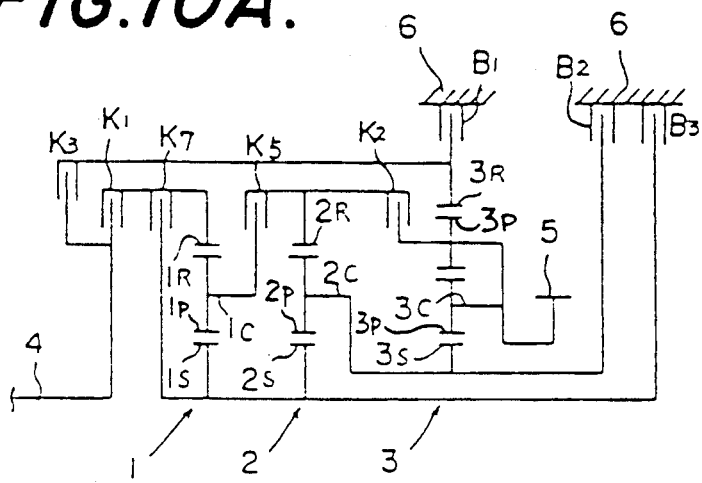

FIG. 10A shows another embodiment of the invention, which is identical with the embodiment of FIGS. 4A and 4B, with exceptions of the addition of a seventh clutch K7 for selectively connecting the sun gear 1S and ring gear 1R of the first planetary gear unit 1, and the five forward drive positions rather than the seven forward drive positions. FIG. 10B indicates the operating states of the clutches and brakes of the present device, by way of example.

Figures 11A, 11B:
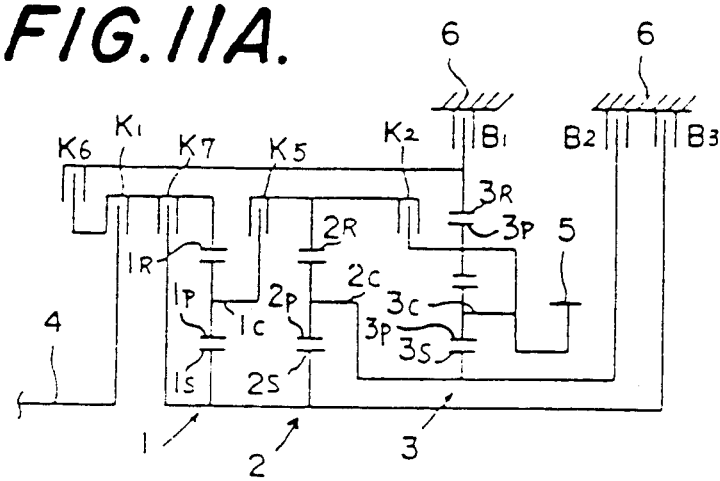

The embodiment of FIGS. 6A and 6B may be modified into an embodiment of FIG. 11A, by adding the seventh clutch K7 for selective connection between the sun and ring gears 1S, 1R of the first planetary gear unit 1, as in the preceding embodiment of FIGS. 10A and 10B. FIG. 11B indicates the operating states of the clutches and brakes, by way of example.

Figures 12A, 12B:
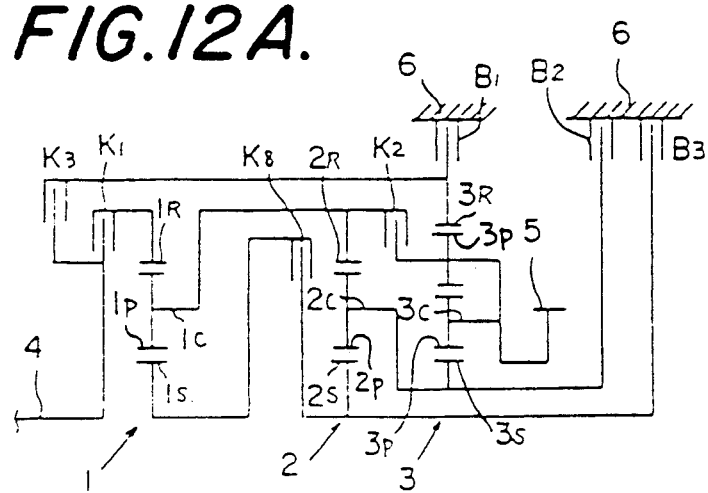

Referring to FIG. 12A, there is shown a further modified speed changing device of the invention, wherein the sun gears 1S and 2S of the first and second planetary gear units 1, 2 are selectively connected. Specifically, the present embodiment is obtained by adding to the embodiment of FIGS. 2A and 2B an eighth clutch K8 disposed between the first and second sun gears 1S, 2S for selective connection therebetween. The present device has the six forward drive positions and the one reverse position, as indicated in FIG. 12B, which also indicates the operating states of the clutches and brakes, by way of example.

Figures 13A, 13B:
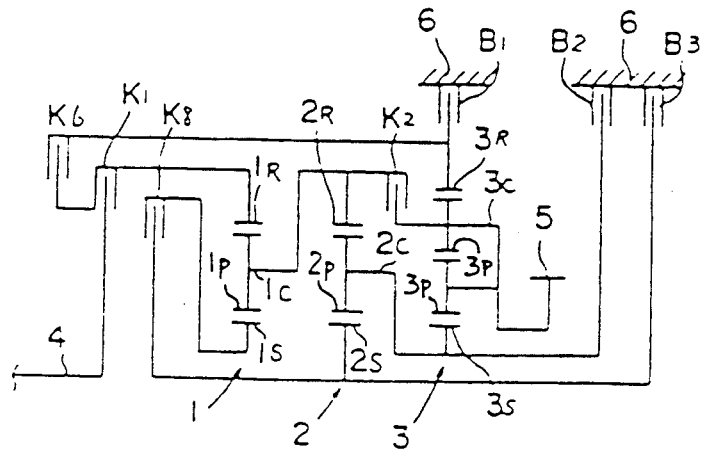

A further modified embodiment of the invention is illustrated in FIG. 13A. This embodiment is obtained by modifying the device of FIGS. 6A and 6B, such that the fifth clutch K5 of FIG. 6A is replaced by the eighth clutch K8 for selective connection between the first and second sun gears 1S, 2S, as in the above embodiment of FIGS. 12A and 12B. The present embodiment has six forward drive positions and one reverse position, whose operating states of the clutches and brakes are indicated in FIG. 13B, by way of example.

Figures 14A, 14B:
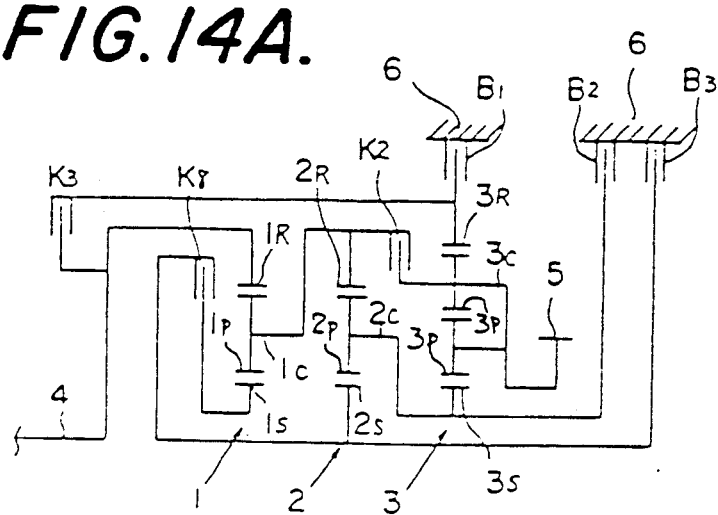

The first embodiment of the invention shown in FIG. 1A may be modified by the addition of the eight clutch K8 for selective connection between the first and second sun gears 1S, 2S, as illustrated in FIG. 14A. FIG. 14B indicates the operating states of the clutches K2, K3, K8 and brakes B1-B3 of the present device, by way of example.

In all of the above embodiments, the carrier 3C of the third planetary gear unit 3 is fixed to the output shaft 5 for rotation as a unit. However, the ring gear 3R of the third planetary gear unit 3 may be fixed to the output shaft 5, provided that the principle of the present invention is practiced such that the sun gears 1S, 2S of the first and second planetary gear units are fixed to each other or selectively connectable to each other through clutch means, such that the carrier 1C of the first planetary gear unit, the ring gear 2R of the second planetary gear unit and the carrier 3C of the third planetary gear unit are fixed to each other or selectively connectable to each other through clutch means, and such that the carrier 2C of the second planetary gear unit and the sun gear 3S of the third planetary gear unit are fixed to each other or selectively connectable to each other through clutch means. In this case, the speed changing gear device should be modified as described below and illustrated in FIGS. 15A-17A, 18-24, 25A and 26, so as to avoid the operative disconnection of the second carrier 2C and the third sun gear 3S from the input shaft 4 by the first planetary gear unit 1, or by the connecting members for connection between the individual elements of each planetary gear unit 1, 2, 3 and between these elements and the brakes.

Figure 15A:
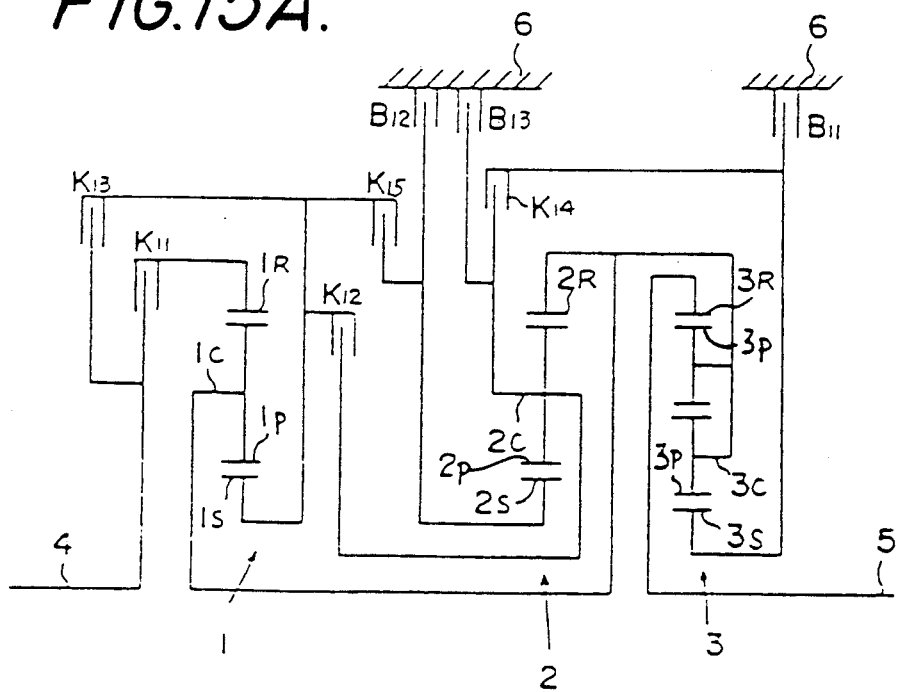

Referring to FIG. 15A, the speed changing gear device shown therein has the first and second planetary gear units 1, 2 each of which is a single-pinion type, and the third planetary gear unit 3 which is a double-pinion type, as in the preceding embodiments of FIGS. 1A-14A. The carrier 1C of the first planetary gear unit 1 and the ring gear 2R of the second planetary gear unit 2 are integrally fixed together, and the carrier 3C of the third planetary gear unit 3 is fixed to those first carrier 1C and second ring gear 2R. Unlike the preceding embodiments wherein the first and second sun gears 1S, 2S are fixed together, the present embodiment of FIG. 15A is adapted such that these first and second sun gears 1S, 2S are selectively connectable to each other through clutch means (hereinafter referred to as "fifth clutch K15"). Further, the second carrier 2C and the third sun gear 3S which are fixed together in the preceding embodiments are selectively connectable through another clutch means (hereinafter referred to as "fourth clutch K14). To comply with these modifications, brake means (hereinafter referred to as "first brake B11") is disposed between the third sun gear 3S and the casing 6 to selectively hold the sun gear 3S stationary, while another brake means (hereinafter referred to as "second brake B12") is disposed between the second sun gear 2S and the casing 6 to selectively hold the sun gear 2S. Further, the second carrier 2C is selectively held stationary by still another brake means (hereinafter referred to as "third brake B13") disposed between the second carrier 2C and the casing 6.

The present speed changing device uses clutch means in the form of a first clutch K11 for selectively connecting the input shaft 4 and the first ring gear 1R, another clutch means in the form of a second clutch K12 for selectively connecting the first sun gear 1S and the second carrier 2C, and further clutch means in the form of a third clutch K13 for selectively connecting the input shaft 4 and the first sun gear 1S. The output shaft 5 of the transmission is integrally fixed to the ring gear 3R of the third planetary gear unit 3.

The speed changing gear device constructed as described above provides five or seven forward drive positions and one reverse position, which are established by controlling the clutches K11, K12, K13, K14 and K15 and the brakes B11, B12 and B13, as indicated in the table of FIG. 15B wherein the engaged clutches and brakes are indicated by the "o" marks while the released or disengaged clutches and brakes are indicated by the "x" marks. The table indicates the speed reduction ratio of each operating position of the gear device, where the gear ratios $\rho_1$, $\rho_2$ and $\rho_3$ of the first, second and third planetary gear units 1, 2, 3 are 0.464, 0.482 and 0.302, respectively. The five forward positions and the one reverse position will be first described, and the additional two forward drive positions will then be described.

1ST-SPEED POSITION

In this position, the first ring gear 1R is rotated with the input shaft 4 while the first and second sun gears 1S, 2S are connected to each other, with the second carrier 2C and the third sun gear 3S held stationary. In other words, the first clutch K11 is engaged to connect the input shaft 4 to the first sun gear 1S, and the fifth clutch K15 is engaged to connect the first and second sun gears 1S, 2S. Further, the first brake B11 is engaged to fix the third sun gear 3S to the casing 6, and the third brake B13 is engaged to fix the second carrier 2C to the casing 6. In the first planetary gear unit 1, consequently, the first carrier 1C is rotated in the forward direction at a speed lower than that of the input shaft 4 rotated with the first ring gear 1R, while the first sun gear 1S is rotated in the reverse direction. In the second planetary gear unit 2, the sun gear 2S connected to the first sun gear 1S is rotated in the reverse direction, and the second carrier 2C is held stationary by the third brake B13. Consequently, the second ring gear 2R is rotated in the forward direction at a speed lower than that of the input shaft 4. The rotation of the second ring gear 2R is transmitted to the third carrier 3C. As a result, the carrier 3C of the third planetary gear unit 3 is rotated in the forward direction at a comparatively low speed with the third sun gear 3S held stationary, whereby the third ring gear 3R and the output shaft 5 fixed to the ring gear 3R are rotated in the forward direction at a speed considerably lower than that of the input shaft 4. That is, the 1st-speed position has the highest speed reduction ratio represented by $(\rho_1+\rho_2+\rho_1\rho_2)/\rho_2(1-\rho_3)$ as indicated in FIG. 15B, which is equal to 3.471. Although the fourth clutch K14 may be engaged in this 1st-speed position, it is desirable that the fourth clutch K14 be held released or disengaged, so as to reduce the number of the frictional coupling elements that should be operated for establishing the 1st-speed position, i.e., so as to reduce the shifting shock. No circulation of power will take place in the 1st-speed position.

2ND-SPEED POSITION

In this position, the first ring gear 1R is rotated with the input shaft 4, with the first, second and third sun gears 1S, 2S, 3S held stationary. In other words, the first clutch K11 is engaged to connect the first ring gear 1R to the input shaft 4, and the fifth clutch K15 is engaged for connecting the first and second sun gears 1S, 2S. Further, the second brake B12 is engaged to fix the first and second sun gears 1S, 2S to the casing 6, and the first brake B11 is engaged to fix the third sun gear 3S to the casing 6. Namely, the 2nd-speed position is established by releasing the third brake B13 and engaging the second brake B12 while the device is placed in the 1st-speed position. Consequently, the ring gear 1R of the first planetary gear unit 1 is rotated with the input shaft 4, with the sun gear 1S held stationary. As a result, the first carrier 1C is rotated in the forward direction at a speed lower than that of the input shaft 4, and the rotation of the first carrier 1C is imparted to the third carrier 3C. In the third planetary gear unit 3, the third carrier 3C is rotated in the forward direction at a speed lower than that of the input shaft 4, with the third sun gear 3S held stationary. Consequently, the third ring gear 3R and the output shaft 5 fixed thereto are rotated in the forward direction at a speed lower than that of the input shaft 4. In the 2nd-speed position, the second carrier 2C is not connected to the input shaft 4 and not fixed to the casing 6. Therefore, the second planetary gear unit 2 does not contribute to a speed changing action. The speed reduction ratio of the 2nd-speed position is represented by $(1+\rho_1)/(1-\rho_3)$ as indicated in FIG. 15B, which is equal to 2.094. In this case, too, no circulation of power will occur.

3RD-SPEED POSITION

The first ring gear 1R and the first sun gear 1S are connected to the input shaft 1, with the third sun gear 3S held stationary. That is, the first brake B11 is engaged to fix the third sun gear 3S to the casing 6, while the first and third clutches K11 and K13 are engaged, to connect the first ring gear 1R and the first sun gear 1S to the input shaft 4. In the 3rd-speed position, the second planetary gear unit 2 does not contribute to a speed reducing action, and therefore the fifth clutch K15 may be released. However, the clutch K15 preferably remains engaged, so that the number of the frictional coupling elements that should be operated for establishing the 3rd-speed position is reduced, for reduced shifting shock. The 3rd-speed position is established by releasing the second brake b12 and engaging the third clutch K13 while the device is placed in the 2nd-speed position. In the 3rd-speed position, the two elements of the first planetary gear unit 1, i.e., the first ring gear 1R and the first sun gear 1S are rotated with the input shaft 4, whereby the unit 1 as a whole is rotated with the input shaft 4. The rotation of the first carrier 1C is imparted to the carrier 3C of the third planetary gear unit 3. As a result, the third sun gear 3S is held stationary, and the third carrier 3C is rotated in the forward direction at the same speed as the input shaft 4. Consequently, the third ring gear 3R and the output shaft 5 secured thereto are rotated in the forward direction at a speed slightly lower than that of the input shaft 4. In the 3rd-speed position, the second carrier 2C is not connected to the input shaft 4 and not fixed to the casing 6, the second planetary gear unit 2 does not contribute to a speed changing action. Thus, the third planetary gear unit 3 is substantially assigned to effect speed reduction in the 3rd-speed position. Namely, the speed reduction ratio of this position is represented by $1/(1-\rho_3)$ as indicated in FIG. 15B, which is equal to 1.432. No circulation of power will occur in this forward drive position.

4TH-SPEED POSITION

The basic operating principle in this 4th-speed position is such that the sun gear 3S and the carrier 3C of the third planetary gear unit 3 are rotated in the forward direction at the same speed as the input shaft 4. More specifically, the third clutch K13 and the fourth clutch K14 are both engaged, while at least two of the first, second and fifth clutches K11, K12 and K15 are engaged. When the speed changing gear device is shifted between the 3rd-speed and 4th-speed positions, the first, third and fifth clutches K11, K13, K15 are placed in the engaged state before the shifting action occurs. In this condition, the fourth clutch K14 is engaged and the brake B11 is disengaged if the device is shifted from the 3rd-speed position to the 4th-speed position. If the device is shifted from the 4th-speed position to the 3rd-speed position, the fourth clutch K14 is disengaged and the first brake B11 is engaged. When the shifting occurs between the 4th-speed and 5th-speed positions, the second, third and fourth clutches K12-K14 are placed in the engaged state before the shifting occurs. In this condition, the first clutch K11 and the second brake B12 are appropriately engaged or released to shift the device between the 4th-speed and 5th-speed positions. In any case, the 4th-speed position is established by concurrent engagement of the four clutches K11, K13, K14 and K15, or K11, K12, K13 and K14, with all of the three brakes B11-B13 released. Therefore, the gear train of the device as a whole is rotated as a unit in the 4th-speed position to transmit power from the input shaft 4 to the output shaft 5, without a speed changing effect. That is, the speed reduction ratio of the 4th-speed position is equal to "1". In this position, too, no circulation of power will occur.

5TH-SPEED POSITION

In this position, the second carrier 2C and the third sun gear 3S are rotated in the forward direction at the same speed as the input shaft 4, with the second sun gear 2S held stationary. Specifically, the second and third clutches K12, K13 are engaged for connecting the second carrier 2C to the input shaft 4 while the fourth clutch K14 is engaged connecting the second carrier 2C and the third sun gear 3S. Further, the second brake B12 is engaged to fix the second sun gear 2S to the casing 6. In other words, the 5th-speed position is established by releasing the first clutch K11 and engaging the second brake B12, while the device is placed in the 4th-speed position if the 4th-speed position is established by concurrent engagement of the first through fourth clutches K11-K14. If the 4th-speed position is established by concurrent engagement of the second through fifth clutches K12-K15, the 5th-speed position is established by releasing the fifth clutch K15 and engaging the second brake B12 while the device is placed in the 4th-speed position. In the second planetary gear unit 2, therefore, the second carrier 2C is rotated with the input shaft 4, with the second sun gear 2S held stationary, whereby the second ring gear 2R is rotated in the forward direction at a speed higher than that of the input shaft 4. The rotation of the second ring gear 2R is imparted to the carrier 3C of the third planetary gear unit 3. In the third planetary gear unit 3, the third sun gear 3S connected to the second carrier 2C is rotated in the forward direction at the same speed as the input shaft 4, and the third carrier 3C connected to the second ring gear 2R is rotated in the forward direction at a speed higher than the input speed 4. As a result, the third ring gear 3R and the output shaft 5 secured thereto is rotated in the forward direction at a speed higher than the input shaft 4. Thus, the 5th-speed position is an overdrive position whose speed reduction ratio is represented by $1/\{(1+\rho_2)(1-\rho_3)+\rho_3\}$, which is equal to 0.749, as indicated in FIG. 15B. In this position, too, no circulation of power will take place.

REVERSE POSITION

In this reverse or rear drive position, the sun gear 2S of the second planetary gear unit 2 is rotated with the input shaft 4, while the second carrier 2C and the third sun gear 3S are held stationary. That is, the first brake B11 is engaged to fix the third sun gear 3S to the casing 6, and the third brake B13 is engaged to fix the second carrier 2C to the casing 6. Alternatively, the first brake B11 and the fourth clutch K14 are engaged to hold the second carrier 2C and the third sun gear 3S, and the third clutch K13 and the fifth clutch K15 are engaged to rotate the second sun gear 2S with the input shaft 4. In the second planetary gear unit 2, therefore, the second sun gear 2S is rotated with the input shaft 4 while the second carrier 2C is held stationary, whereby the second ring gear 2R is rotated in the reverse direction, and the rotation of the ring gear 2R is imparted to the third carrier 3C. In the third planetary gear unit 3, the carrier 3C is rotated in the reverse direction with the third sun gear 3S held stationary, whereby the third ring gear 3R and the output shaft 5 secured thereto are rotated in the reverse direction at a speed lower than the input shaft 4. Since the first ring gear 1R is not connected to the input shaft 4, the first planetary gear unit 1 does not contribute to speed reduction in the reverse position. The speed reduction ratio is represented by $-1/\rho_2(1-\rho_3)$, which is equal to $-2.981$, as indicated in FIG. 15B. In this case, too, no circulation of power will occur.

It will be understood from the above description of the speed changing device of FIGS. 15A and 15B that the speed reduction ratio of each of the five forward speed positions and the reverse position is suitably determined within a desired range, with optimum ratios of the speed reduction ratios of the individual operating positions. Further, only two frictional coupling elements selected from among the clutches and brakes discussed above are operated to establish each of the operating positions or to shift the gear device. It is also noted that no circulation of power will occur in any positions. Thus, the present speed changing gear device is comparatively easy to control, exhibits improved power transmitting characteristics and efficiency, and suffers from reduced shifting shock. In the 5th-speed position, the carrier 2C of the second planetary gear unit 2 is connected to the sun gear 1S of the first planetary gear unit 1 which does not contribute to speed changing. Therefore, the gear device is operative in the 5th-speed position, even though the second carrier 2C is operatively disconnected from the input shaft 4 by the first and third planetary gear units 1, 3 or by the connecting members which connect the elements of these planetary gear units 1, 3. In the 5th-speed position, the second carrier 2C is connected to the input shaft 4 through the first sun gear 1S. Accordingly, the speed of the planetary pinion 1P relative to the first carrier 1C is made relatively low, whereby the durability of the first planetary gear unit 1 including the planetary pinion 1P and the pinion bearing is improved. In this respect, it is noted that the 5th-speed position is relatively frequently used.

The speed changing gear device of FIGS. 15A and 15B may be adapted to provide two additional forward drive positions, 2.5th-speed position and 3.5th-speed position, as indicated in FIG. 15B. The speed reduction ratio of the 2.5th-speed is intermediate between those of the 2nd-speed and 3rd-speed positions, while that of the 3.5th-speed position is intermediate between those of the 3rd-speed and 4th-speed positions.

2.5TH-SPEED POSITION

This forward drive position intermediate between the 2nd-speed and 3rd-speed positions is established by concurrent engagement of the first, fourth and fifth clutches K11, K14, K15 and the second brake B12. Specifically, the second brake B12 is engaged to fix the first and second sun gears 1S, 2S to the casing 6 while the fifth clutch K15 is in the engaged position, and the fourth clutch K14 is engaged to connect the second carrier 2C and the third sun gear 3S. In this condition, the first ring gear 1R is connected to the input shaft 4, for rotation as a unit. Consequently, the first ring gear 1R is rotated with the input shaft 4, while the first sun gear 1S is held stationary, whereby the first carrier 1C is rotated in the forward direction at a speed lower than that of the input shaft 4. The rotation of the first carrier 1C is transmitted to the second ring gear 2R and the third carrier 3C. In the second planetary gear unit 2, the second ring gear 2R is rotated in the forward direction at a speed lower than that of the input shaft 4, while the second sun gear 2S is held stationary, whereby the second carrier 2C is rotated in the forward direction at a speed lower than that of the second ring gear 2R. The rotation of the second carrier 2C is imparted to the third sun gear 3S. In the third planetary gear unit 3, therefore, the third carrier 3C is rotated in the forward direction at a speed lower than that of the input shaft 4, and the third sun gear 3S is rotated in the forward direction at a speed lower than that of the third carrier 3C, whereby the third ring gear 3R is rotated in the forward direction between the third ring gear 3R and the third sun gear 3S. Thus, the rotation of the input shaft 4 is transmitted to the output shaft 5 through the first, second and third planetary gear units 1, 2, 3, so that the speed of the output shaft 5 is reduced with respect to that of the input shaft 4. The speed reduction ratio of the present 2.5th-speed position is represented by $(1+\rho_1)(1+\rho_2)/(1+\rho_2-\rho_2\rho_3)$, which is equal to 1.632, as indicated in FIG. 15B.

3.5TH-SPEED POSITION

This forward drive position intermediate between the 3rd-speed and 4th-speed position is established by concurrent engagement of the first, third and fourth clutches K11, K13, K14 and the second brake B12. Specifically, the first ring gear 1R and the first sun gear 1S are connected to the input shaft 4, and the second sun gear 2S is held stationary. Further, the second carrier 2C and the third sun gear 3S are connected to each other. In the 3.5th-speed position, therefore, the two elements of the first planetary gear unit 1 are rotated with the input shaft 4, and the gear unit 1 as a whole is rotated at the same speed as the input shaft 4. Consequently, the second sun gear 2R and third carrier 3C which are secured to the first carrier 1C are rotated at the same speed as the input shaft 4 in the forward direction. In the second planetary gear unit 2, the second sun gear 2S is held stationary, the second ring gear 2R is rotated in the forward direction at the same speed as the input shaft 4, whereby the second carrier 2C is rotated in the forward direction at a speed lower than that of the input shaft 4. The rotation of the second carrier 2C is imparted to the sun gear 3S of the third planetary gear unit 3. As a result, the third sun gear 3S is rotated in the forward direction at the speed reduced by the second planetary gear unit 2, while the third carrier 3C is rotated in the forward direction at the same speed as the input shaft 4. Consequently, the third ring gear 3R and the output shaft 5 secured thereto are rotated in the forward direction at a speed slightly lower than that of the input shaft 4. The speed reduction ratio of the 3.5th-speed position is represented by $(1+\rho_2)/(1+\rho_2-\rho_2\rho_3)$, which is equal to 1.109, as also indicated in FIG. 15B.

Figures 16A, 16B:
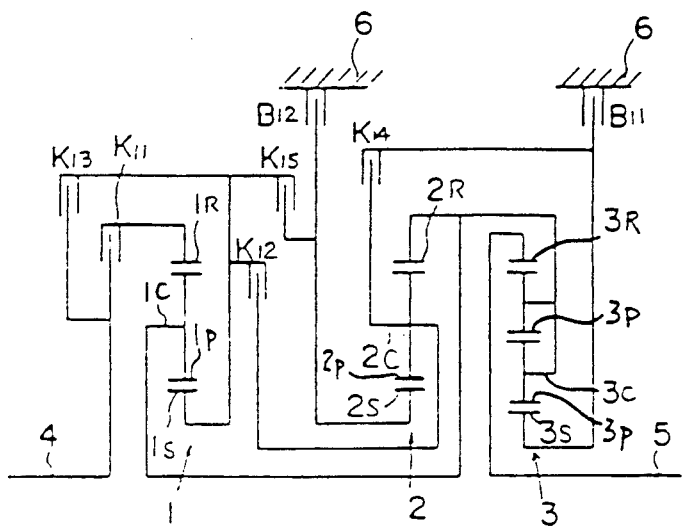

As is apparent from the above explanation, the second carrier 2C can be held stationary by the third brake B13 only, or by the fourth clutch K14 and the first brake B11. Further, the first brake B11 and the fourth clutch K14 can be engaged in the operating positions in which the third brake B13 is engaged. Therefore, the speed changing device of FIGS. 15A and 15B may be adapted to provide the five or seven forward drive positions and the one reverse position, without the provision of the third brake B13. An example of this arrangement is illustrated in FIG. 16A. The operating states of the clutches and brakes are indicated in FIG. 16B.

Figures 17A, 17B:
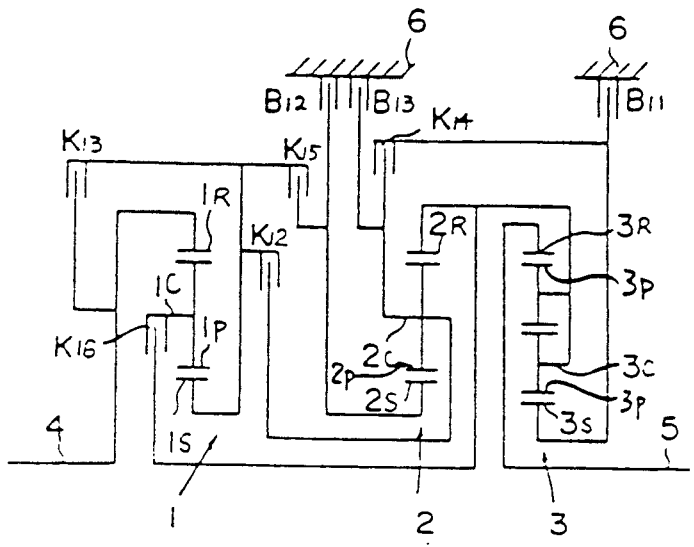

It will be understood from FIGS. 15B and 16B that the first clutch K11 is engaged in the 1st-speed through 4th-speed positions, and released in the 5th-speed and reverse positions. Since the first planetary gear unit 1 does not contributes to speed changing in the 5th-speed and reverse positions, it is possible that the first clutch K11 is eliminated and the first ring gear 1R is fixed to the input shaft 4. An example of this modification is illustrated in FIG. 17A. More particularly, the speed changing gear device of FIG. 17A does not have the first clutch K11 as provided in the device of FIGS. 15A and 15B, and incorporates clutch means in the form of a sixth clutch K16 disposed between the first carrier 1C and the second ring gear 2R and third carrier 3C. The present device provides the five or seven forward drive positions and the reverse position, as indicated in FIG. 17B, which indicates the operating positions of the clutches and brakes.

The arrangement of the first, second and third planetary gear units 1, 2, 3 of the speed changing device of FIGS. 15A, 15B may be suitably modified as illustrated in FIGS. 18–26.

Figure 18:
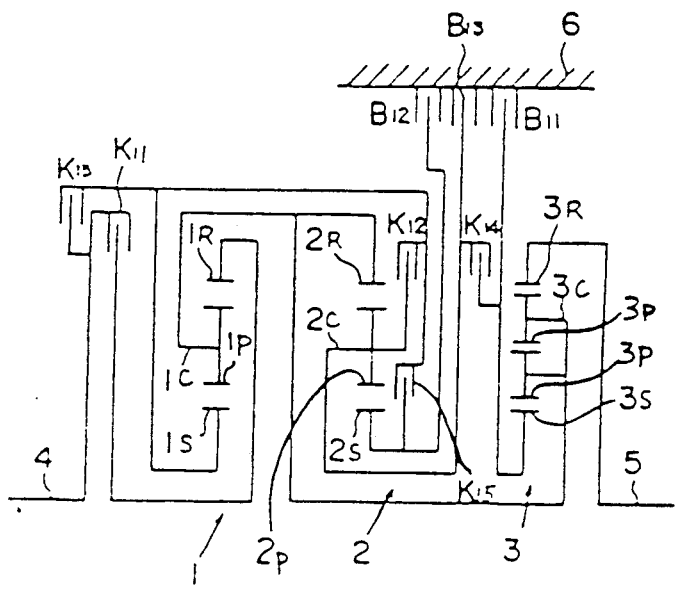

In the arrangement of FIG. 18, the first, second and third planetary gear units 1, 2, 3 are disposed in the order of description from the side of the input shaft 4, and all the frictional coupling means except for the first and third clutches K11, K13 are disposed between the second and third planetary gear units 2, 3.

Figure 19:
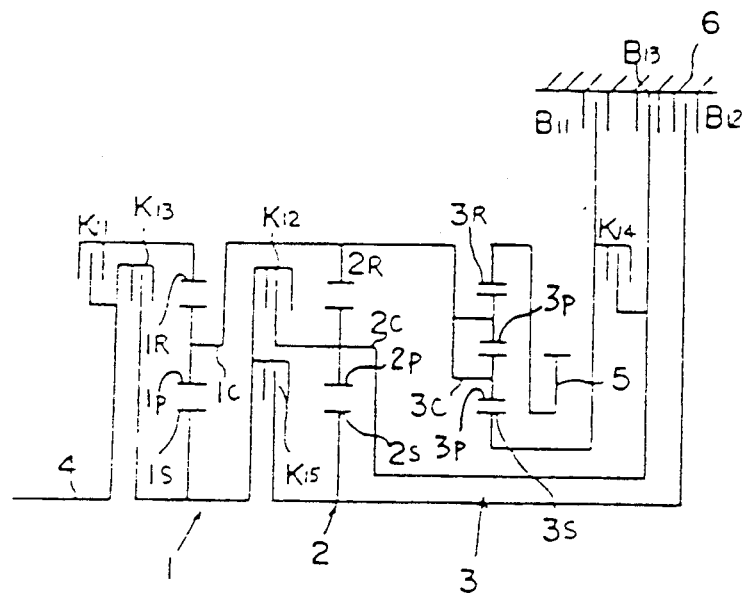

In the arrangement of FIG. 19, the first, second and third brakes B11, B12, B13 and the fourth clutch K14 associated with these brakes are all disposed on one side of the third planetary gear unit 3 which is remote from the second planetary gear unit 2.

Figure 20:
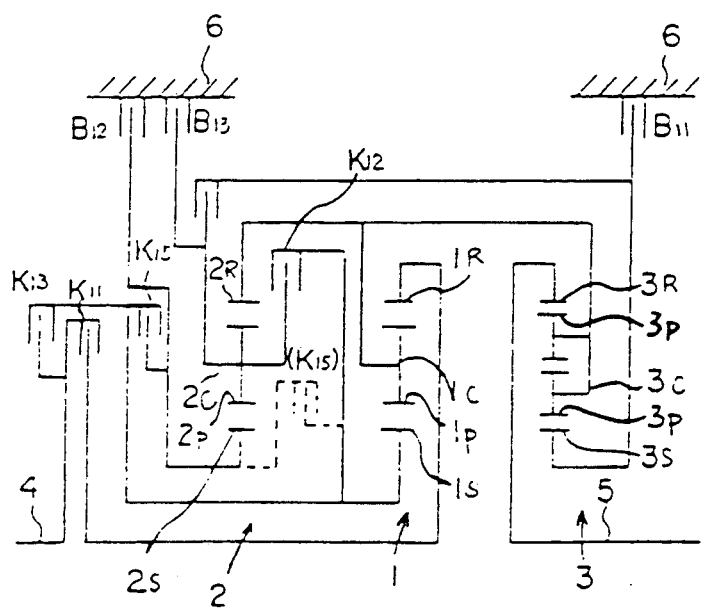

In the arrangement of FIG. 20, the second gear unit 2, the first gear unit 1 and the third gear unit 3 are arranged in this order from the side of the input shaft 4, and all the frictional coupling means except for the second clutch K12 are disposed between the gear train of the gear device and the input shaft 4. The fifth clutch K15 may be disposed between the second and first planetary gear units 2, 1, as indicated in broken line in FIG. 20.

Figure 21:
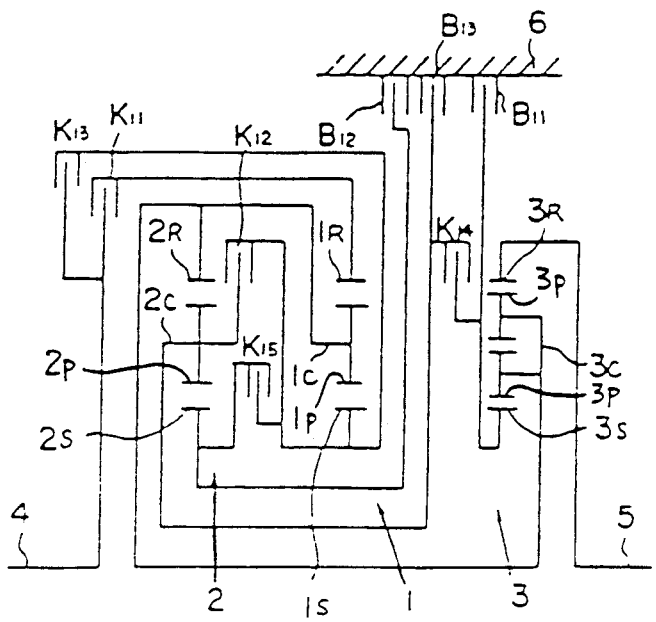

In the arrangement of FIG. 21, the second gear unit 2, the first gear unit 1 and the third gear unit 3 are arranged in this order from the side of the input shaft 4, and the first, second and third brakes B11, B12 and B13 are disposed between the first and third gear units 1, 3.

Figure 22:
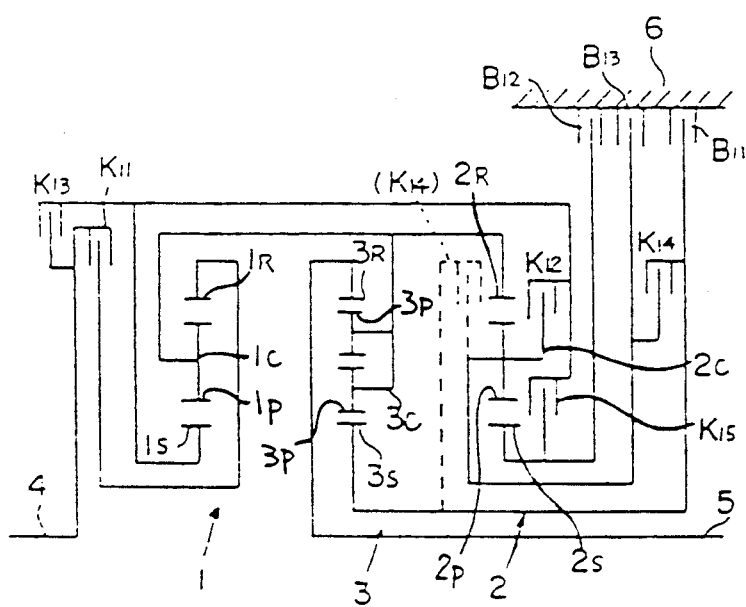
Figure 23:
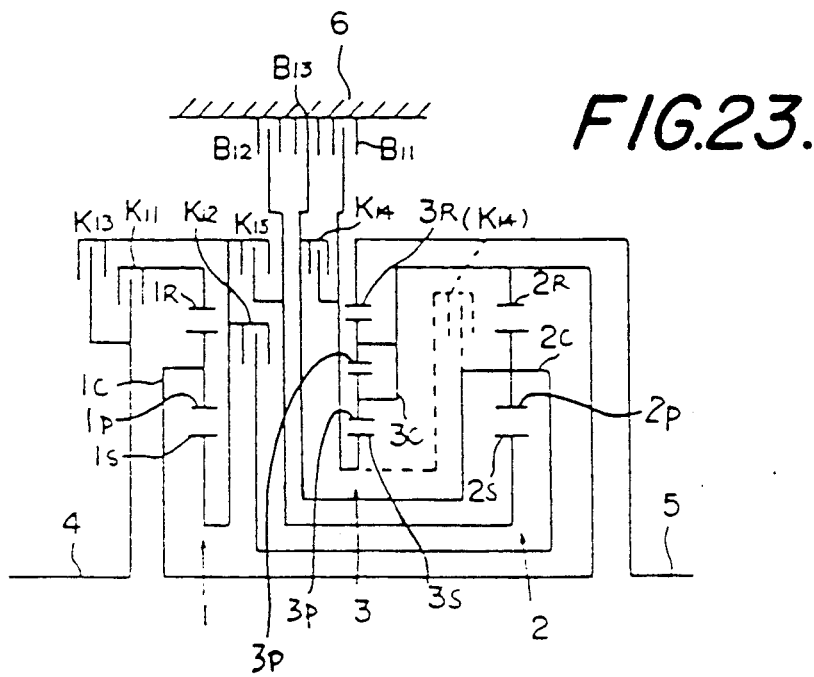
Figure 24:
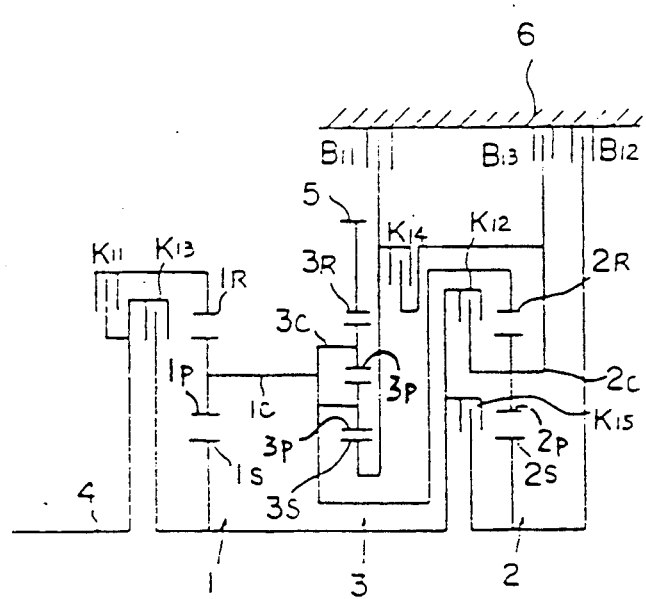

The first gear unit 1, the third gear unit 3 and the second gear unit 2 may be arranged in this order from the side of the input shaft 4, as illustrated in FIGS. 22-24, by way of example.

In the arrangement of FIG. 22, the first, second and third brakes B11, B12, B13 are disposed on one side of the gear train of the device which is remote from the input shaft 4. In this case, the fourth clutch K14 may be disposed between the third and second gear units 3, 2, as indicated in broken line in FIG. 22.

In the arrangement of FIG. 23, the brakes B11, B12, B13 are disposed between the first and third gear units 1, 3. In this case, too, the fourth clutch K14 may be disposed between the third and second gear units 3, 2, as indicated in broken line in FIG. 23.

In the arrangement of FIG. 24, all the clutches except for the first and third clutches K11, K13 are disposed between the third and second gear units 3, 2, and the output shaft 5 is disposed radially outwardly of the third gear unit 3. This arrangement is suitable for an F—F (front-engine front-drive) motor vehicle.

Figures 25A, 25B:
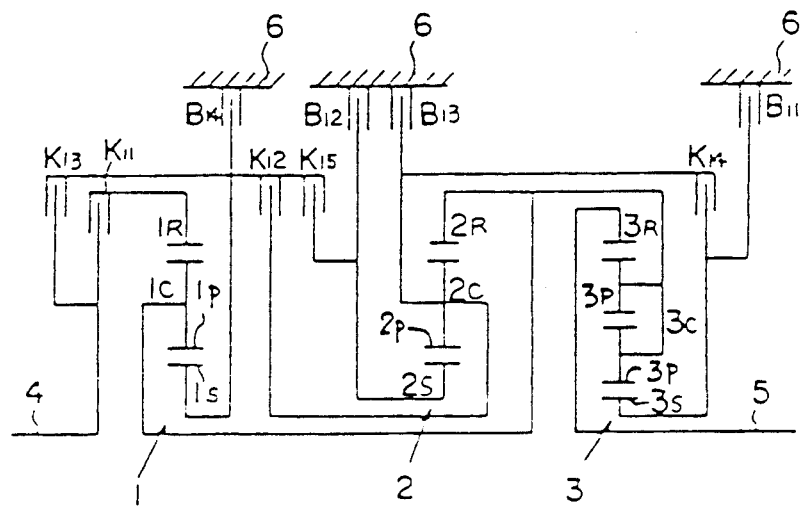

The speed changing device of FIGS. 15A and 15B may be provided with a fourth brake B14 as indicated in FIG. 25A. As indicated in FIG. 25A, the fourth brake B14 is disposed between the first sun gear 1S and the casing 6. In the other aspects, the embodiment of FIG. 25A is identical with the embodiment of FIG. 15A. This embodiment of FIG. 25A provides the five or seven forward drive positions and the reverse position, as indicated in FIG. 25B wherein the operating states of the clutches and brakes are also indicated, by way of example only.

However, the speed changing device of FIG. 25A may be adapted to establish each of the operating positions, by controlling the five clutches K11-15 and the four brakes B11-B14 such that these frictional coupling elements are engaged in one of the combinations as indicated in FIG. 26. In FIG. 26, the coupling elements marked "o" are engaged while the non-marked coupling elements are released. The "*" marks indicate the coupling elements which may or may not be engaged.

As is understood from FIG. 26, each of the first, third and fourth brakes B11, B13, B14 may be held released or disengaged if the clutches K11-K15 and the second brake B12 are placed in the specific operating states. Therefore, one or two of these first, third and fourth brakes B11, B13, B14 may be eliminated. It will be readily understood from the table of FIG. 26 that various control variations are possible for controlling the coupling elements of the embodiment of FIG. 25A.

Each of the clutches K1-K8 and K11-K16 and the brakes B1-B3 and B11-B14 used in the embodiments which have been discussed above is a multiple-disk clutch or brake, as indicated by the appropriate symbol in the relevant figures. In the present invention, however, these clutch and brake means may be constituted by suitable frictional coupling means which has a one-way power transmitting function, for example, by a known one-way clutch using sprags or other rolling elements, or by a known one-way band brake whose torque capacity changes with the direction in which a load is applied. Further, these one-way clutches and band brakes may be used alone or in combination with a multiple-disk clutch or brake. The use of the clutch and brake means having the one-way power transmitting function makes it possible to reduce the number of the coupling elements that should be operated for selectively establishing the operating positions of the speed changing gear device, and permits automatic engaging and disengaging actions of the gear device due to a change in the load torque, resulting in minimizing the amount of shifting shock of the gear device.

Typical examples of arrangements incorporating these one-way clutch and brake means are illustrated in FIGS. 27-37.

Figures 27, 28, 29:
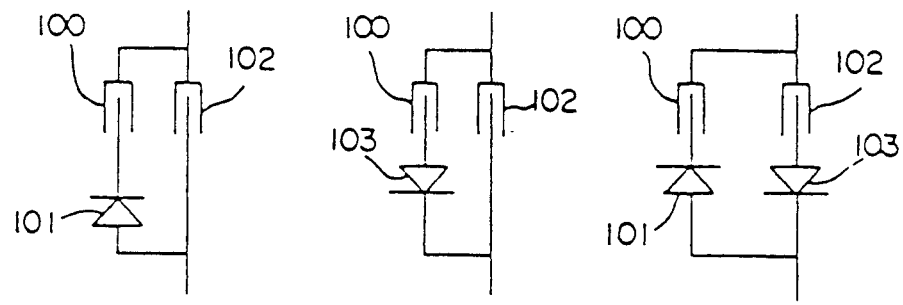
FIGS. 27–37 are schematic views illustrating one-way clutch means and braking means that may be used for the speed changing device of the invention.

An arrangement shown in FIG. 27 is a combination of a multiple-disk clutch 100 in series connection with a one-way clutch 101, and another multiple-disk clutch 102 in parallel connection with the multiple-disk clutch 100 and one-way clutch 101. An arrangement of FIG. 28 uses a one-way clutch 103 in place of the one-way clutch 101 of FIG. 27. The direction in which the one-way clutch 103 transmits power is opposite to the direction in which the one-way clutch 101 transmits power. An arrangement of FIG. 29 is a combination of the multiple-disk clutch 100 in series connection with the one-way clutch 101, and the multiple-disk clutch 102 in series connection with the one-way clutch 103, the two multiple-disk clutches 100, 102 being parallel to each other.

Figures 30, 31, 32:
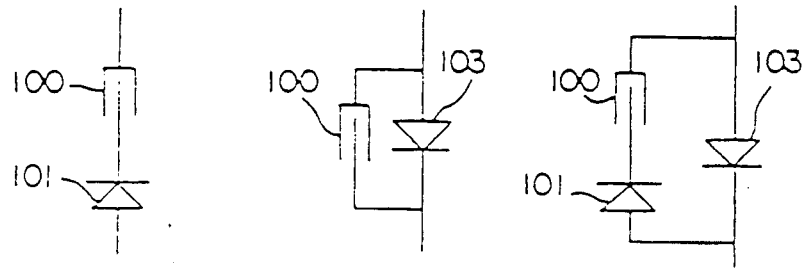

FIG. 30 shows an arrangement consisting of the multiple-disk clutch 100 and the one-way clutch 101 in series connection with each other. An arrangement of FIG. 31 is a combination of the multiple-disk clutch 100 and the one-way clutch 103 in parallel connection with each other. An arrangement of FIG. 32 is a combination of the multiple-disk clutch 100 in series connection with the one-way clutch 101, and the one-way clutch 103 in parallel connection with the clutches 100, 101.

Figures 33, 34, 35:
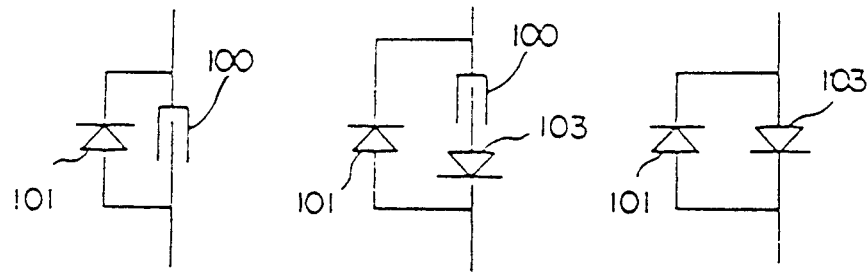

Referring to FIG. 33, there is illustrated an arrangement in which the multiple-disk clutch 100 and the one-way clutch 101 are connected parallel to each other. An arrangement of FIG. 34 is a combination of the multiple-disk clutch 100 in series connection with the one-way clutch 103, and the one-way clutch 101 in parallel connection with the clutches 100, 103. A combination of FIG. 35 consists of the two one-way clutches 101, 103 in parallel connection with each other.

Figures 36, 37:
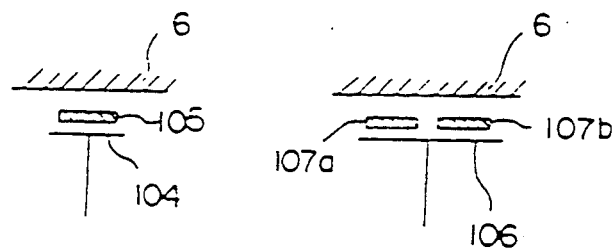

There is shown in FIG. 36 a band brake arrangement in which a brake band 105 fixed at one end thereof to the transmission casing 6 is wound over a drum 104 to which the appropriate member to be braked is fixed. An alternative band brake arrangement is shown in FIG. 37, wherein a pair of brake bands 107a, 107b each fixed at one end thereof to the transmission casing 6 are wound over a drum 106 in the opposite directions. The appropriate member to be braked is fixed to the drum 106.

For one-way coupling means to assure a shock-free shifting action of the gear device, the two elements that are connected to each other by the one-way coupling means should be rotated at the same speed (which may be zero) immediately before the shifting action begins, and rotated at different speeds after the shifting action is terminated. The one-way coupling means may be disposed not only directly between the two elements that are to be connected, but also indirectly between these two elements via another element which is rotated at the same speed immediately before the relevant shifting action. Further, the locations of the one-way coupling means are suitably determined depending upon the particular shifting operations between the two operating positions, which may be the adjacent two positions in terms of the speed reduction ratio, or which may be the non-adjacent two positions such as the 1st-speed and 2.5th-speed positions. By way of examples only, the possible locations of the one-way coupling means such as one-way clutches provided in the embodiments of FIGS. 15A–17A, 18–24 and 25A will be described below.

Between 1st-speed and 2nd-speed Positions

One-way coupling means such as a one-way clutch is provided in at least one of the following locations: between the first and second sun gears 1S, 2S; between the second carrier 2C and the third sun gear 3S; and between the second carrier 2C and the casing 6.

Between the 1st-speed and 2.5th-speed Positions

The one-way coupling means is provided between the second carrier 2C and the casing 6, and/or between the third sun gear 3S and the casing 6.

Between 1st-speed and 3rd-speed Positions

The one-way coupling means is provided in at least one of the following locations: between the first and second sun gears 1S, 2S; between the second carrier 2C and the third sun gear 3S and between the second carrier 2C and the casing 6.

Between the 1st-speed and 3.5th-speed Positions

The one-way coupling means is provided in at least one of the following locations: between the first and second sun gears 1S, 2S; between the second carrier 2C and the casing 6; and between the third sun gear 3S and the casing 6. In this case, shifting operations between these two positions may require concurrent operations of three or more coupling means.

Between 1st-speed and 4th-speed Positions

The one-way coupling means is provided between the second carrier 2C and the casing 6, and/or between the third sun gear 3S and the casing 6.

Between 1st-speed and 5th-speed Positions

The one-way coupling means is provided in at least one of the following locations: between the first and second sun gears 1S, 2S; between the second carrier 2C and the casing 6; between the third sun gear 3S and the casing 6; and between the first ring gear 1R and the input shaft 4. In this case, too, concurrent operations of three or more coupling means may be required.

Between 2nd-speed and 2.5th-speed Positions

The one-way coupling means is provided between the first and third sun gears 1S, 3S, and/or between the third sun gear 3S and the casing 6.

Between 2nd-speed and 3rd-speed Positions

The one-way coupling means is provided between the first and third sun gears 1S, 3S, and/or between the first sun gear 1S and the casing 6.

Between 2nd-speed and 3.5th-speed Positions

The one-way coupling means is provided in at least one of the following locations: between the first and third sun gears 1S, 3S; between the first sun gear 1S and the casing 6; and between the third sun gear 3S and the casing 6. In this case, concurrent operations of three or more coupling means may be required.

Between 2nd-speed and 4th-speed Positions

The one-way coupling means is provided between the first sun gear 1S and the casing 6, and/or between the third sun gear 3S and the casing 6.

Between 2nd-speed and 5th-speed Positions

The one-way coupling means is provided in at least one of the following locations: between the first sun gear 1S and the casing 6; between the third sun gear 3S and the casing 6; and between the first ring gear 1R and the input shaft 4. In this case, too, concurrent operations of three or more coupling means may be required.

Between 2.5th-speed and 3rd-speed Positions

The one-way coupling means is provided in at least one of the following locations: between the first and second sun gears 1S, 2S; between the first sun gear 1S and the casing 6; and between the second sun gear 2S and the casing 6. Concurrent operations of three or more coupling means may be required.

Between 2.5th-speed and 3.5th-speed Positions

The one-way coupling means is provided between the first and second sun gears 1S, 2S, and/or between the first sun gear 1S and the casing 6.

Between 2.5th-speed and 4th-speed Positions

The one-way coupling means is provided between the first sun gear 1S and the casing 6, and/or between the second sun gear 2S and the casing 6.

Between 2.5th-speed and 5th-speed Positions

The one-way coupling means is provided in at least one of the following locations: between the first and second sun gears 1S, 2S; between the first sun gear 1S and the casing 6; and between the first ring gear 1R and the input shaft 4. In this case, concurrent operations of three or more coupling means may be required.

Between 3rd-speed and 3.5th-speed Positions

Between 3rd-speed and 4th-speed Position

In these cases, the one-way coupling means is provided between the third sun gear 3S and the casing 6.

Between 3rd-speed and 5th-speed Positions

The one-way coupling means is provided in at least one of the following locations: between the third sun gear 3S and the casing 6; between the first sun gear 1S, and the first carrier 1C, first ring gear 1R or third carrier 3C; and between the input shaft 4, and the first carrier 1C, first ring gear 1R or third carrier 3C. Concurrent operations of three or more coupling means may be required in this case.

Between 3.5th-speed and 4th-speed Positions

In this case, the one-way coupling means is provided between the second sun gear 2S and the casing 6.

Between 3.5th-speed and 5th-speed Positions

The one-way coupling means is provided in at least one of the following locations: between the first sun gear 1S, and the first carrier 1C, first ring gear 1R, second ring gear 2R or third carrier 3C; between the input shaft 4, and the first carrier 1C, first ring gear 1R, second ring gear 2R or third carrier 3C.

Between 4th-speed and 5th-speed Positions

In the 4th-speed position, the gear train of the speed changing gear device as a whole is rotated as a unit. Therefore, the one-way coupling means may be provided in one of the following locations, each location between one of the sun gear, ring gear and carrier of one of the three planetary gear units 1, 2, 3, and another element: between the first sun gear 1S, and one of the first carrier 1C, first ring gear 1R, second sun gear 2S, second ring gear 2R, third ring gear 3R and third carrier 3C; between the first carrier 1C, and one of the other elements (which include the input shaft 4) except for the second ring gear 2R, third carrier 3C and casing 6; between the first ring gear 1R, and one of the other elements (which may be the input shaft 4) except for the casing 6; between the second sun gear 2S, and one of the other elements (which may be the input shaft 4) except for the casing 6; between the second carrier 2C, and one of the first carrier 1C, first ring gear 1R, second sun gear 2S, second ring gear 2R, third ring gear 3R and third carrier 3C; between the second ring gear 2R, and one of the other elements (which may be the input shaft 4) except for the first carrier 1C, third carrier 3C and casing 6; between the third sun gear 3S, and one of the first carrier 1C, first ring gear 1R, second sun gear 2S, second ring gear 2R, third ring gear 3R and third carrier 3C; between the third ring gear 3R, and one of the other elements (which may be the input shaft 4) except for the casing 6; and between the third carrier 3C, and one of the other elements (which may be the input shaft 4) except for the first carrier 1C, second ring gear 2R and casing 6.

The one-way coupling means which may be disposed in the above-indicated locations may be used in the manner as disclosed in laid-open Publication Nos. 63-176270 and 63-221670 of unexamined Japanese Patent Applications. Various embodiments of the present invention which use one-way clutches and brakes will be described with reference to FIGS. 38A-44A.

Figures 38A, 38B:
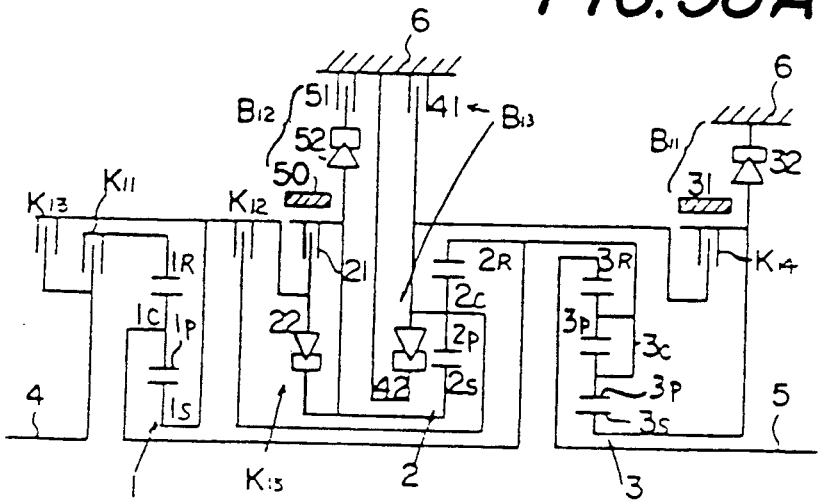

Referring to FIG. 38A, there is illustrated a development of the embodiment of FIG. 15A, in which each of the fifth clutch K15, first brake B11, second brake B12 and third brake B13 incorporates a one-way clutch or brake element. More specifically, the fifth clutch K15 consists of a multiple-disk clutch 21 and a one-way clutch 22 which are disposed in parallel with each other. The first brake B11 consists of a band brake 31, and a one-way clutch 32 which is disposed in parallel with the band brake 31 and associated with the casing 6. The second brake B12 consists of a multiple-disk clutch 51 and a one-way clutch 52 which are disposed in parallel with each other, and a band brake 50 which is disposed in parallel with the clutches 51, 52. The third brake B13 consists of a band brake 41, and a one-way clutch 42 which is disposed in parallel with the band brake 41 and associated with the casing 6. The one-way clutch 42 is located radially inwardly of the band brake 41. The operating states of the clutches and brakes of the gear device of FIG. 38A are indicated in the table of FIG. 38B, by way of example. In the table, the "o" marks indicate the engaged coupling elements while the "x" marks indicate the released coupling elements. Further, the " " indicate the coupling elements which are engaged when power is transmitted in the direction from the output shaft 5 toward the input shaft 4, i.e., when an engine brake is applied to the vehicle. It is noted that three combinations "a", "b" and "c" of the operating states of the coupling elements are available to establish the 4th-speed position, as indicated in FIG. 38B. These three combinations may be sequentially selected for successive shifting operations to the 4th-speed position, or a selected one of the combinations is always used for establishing the 4th-speed position.

Figures 39A, 39B:
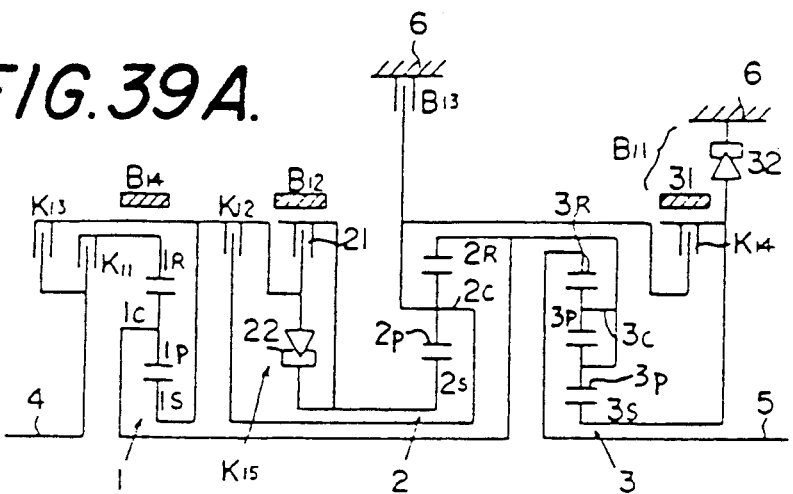

The embodiment of FIG. 39A is a development of the embodiment of FIG. 25A, in which each of the fifth clutch K15, first brake B11 and fourth brake B14 incorporates a one-way coupling element. Specifically, the fifth clutch K15 consists of a multiple-disk clutch 21 and a one-way clutch 22 in parallel with the clutch 21. The first brake B11 consists of a band brake 31, and a one-way clutch 32 which is disposed in parallel with the band brake 31 and associated with the casing 6. The fourth brake B14 consists of a band brake. The operating states of the clutches and brakes of the present gear device are indicated in FIG. 39B, by way of example.

Figures 40A, 40B:
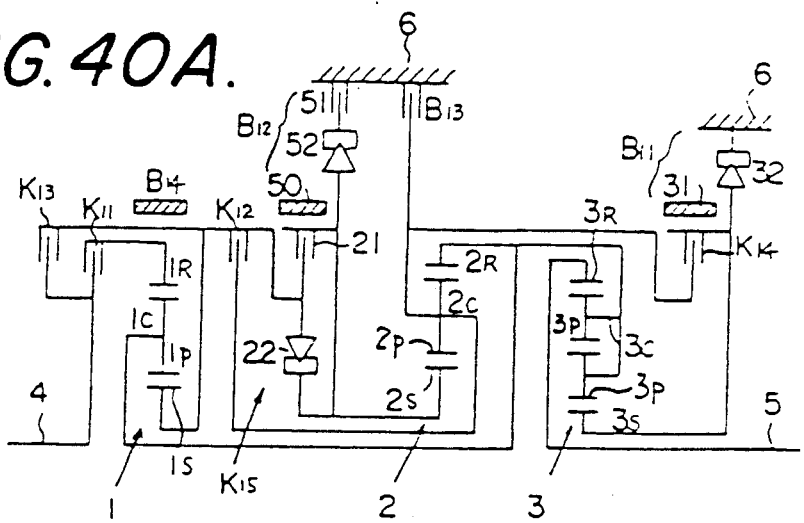

The embodiment of FIG. 40A is a modification of the embodiment of FIG. 39A, in which the second brake B12 has the same arrangement as shown in FIG. 38A, i.e., consists of a multiple-disk brake 51 and a one-way clutch 52 which are disposed in parallel with each other, and a band brake 50 in parallel relation with the brake 51 and clutch 52. The operating states of the clutches and brakes of the present gear device are indicated in FIG. 40B, by way of example.

Figures 41A, 41B:
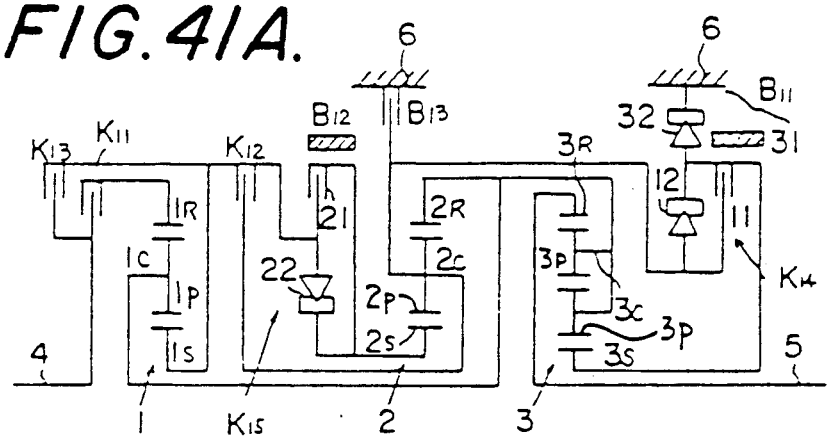

The embodiment of FIG. 41A is a modification of the embodiment of FIG. 38A, in which the fourth clutch K14 consists of a multiple-disk clutch 11 and a one-way clutch 12 in parallel with the clutch 11. Further, the second brake B12 consists of a single band brake, and the third brake B13 consists of a single multiple-disk brake. In the other aspects, the FIG. 41A device is identical with the FIG. 38A embodiment. The operating states of the clutches and brakes of the present device are indicated in FIG. 41B, by way of example.

Figures 42A, 42B:
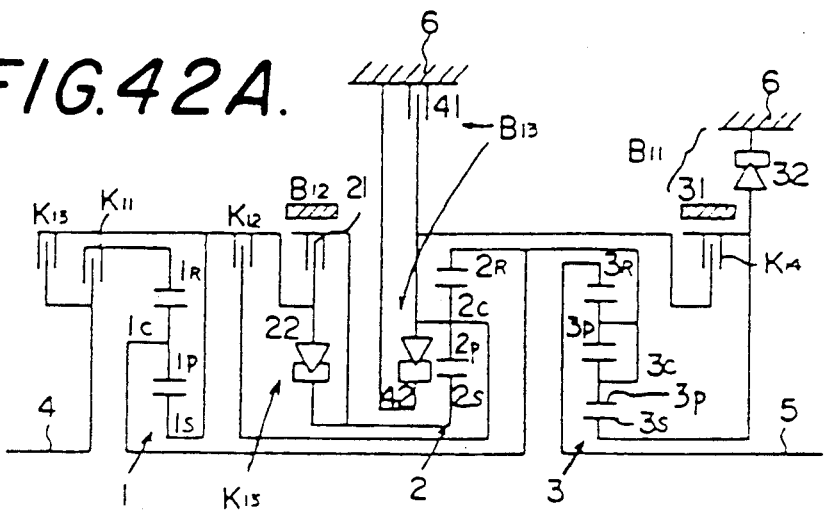

The embodiment of FIG. 42A is also a modification of the embodiment of FIG. 38A, in which the second brake B12 consists of a single band brake. In the other aspects, the FIG. 42A embodiment is identical with the FIG. 38A embodiment. The operating states of the present device are indicated in FIG. 42B, by way of example.

Figures 43A, 43B:
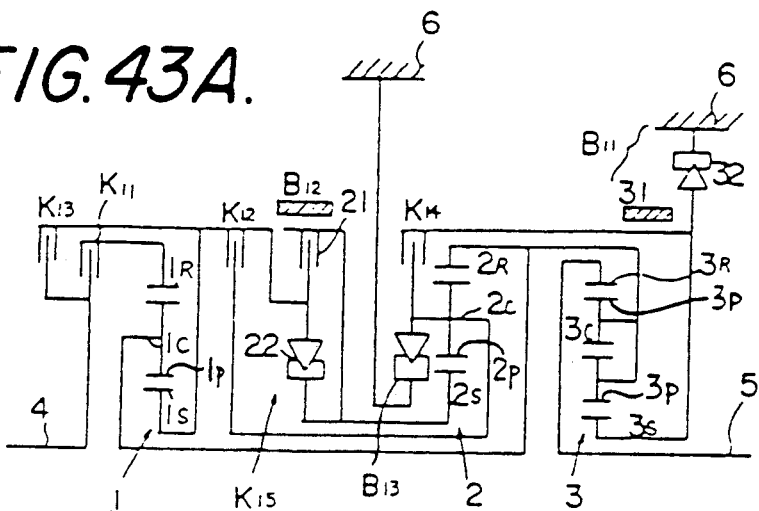

The embodiment of FIG. 43A is identical with the embodiment of FIG. 41A, except that the fourth clutch K14 consists of a single multiple-disk clutch while the third brake B13 is located radially inwardly of the multiple-disk clutch which constitutes the fourth clutch K14. FIG. 43B indicates the operating states of the clutches and brakes of the present device. According to the arrangement of FIG. 43A, the second carrier 2C is held stationary by engagement of the fourth clutch K14 and engagement of the band brake 31 of the first brake B11, while the gear device is placed in the reverse position. This results in a comparatively large torque applied to the fourth clutch K14 while the reverse position is selected. For improved durability and reduced size of the gear device, it is desirable that the output of a vehicle engine, or a torque received by the input shaft 4 be reduced when the reverse position of the gear device is selected.

Figures 44A, 44B:
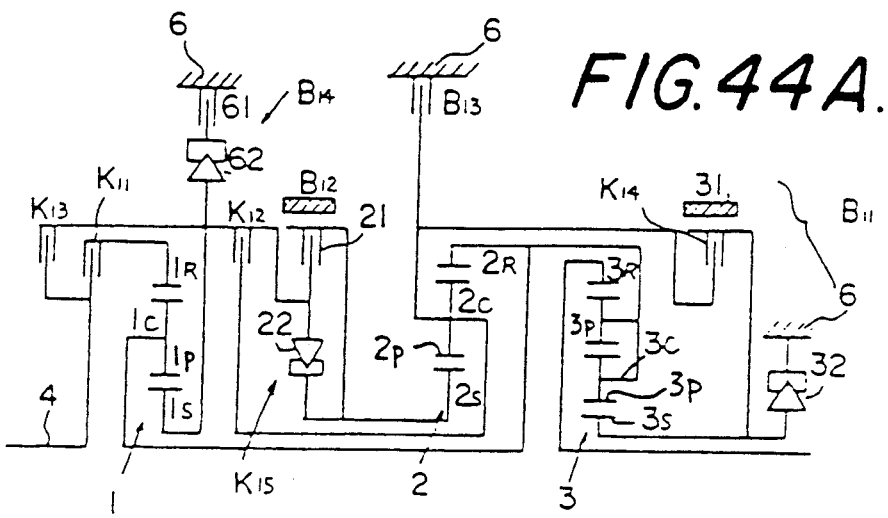

The embodiment of FIG. 44A is a modification of the embodiment of FIG. 39A, in which the one-way clutch 32 constituting the first brake B11 is comparatively small-sized, while the fourth brake B14 consists of a multiple-disk brake 61 and a one-way clutch 62 which are disposed in series connection with each other. The operating states of the clutches and brakes of the present gear device are indicated in FIG. 44B, by way of example.

While the present invention has been described in its presently preferred embodiments, it is to be understood that the invention is not limited to the details of the illustrated embodiments, but may be otherwise embodied, provided that the principle of the invention as described in the SUMMARY OF THE INVENTION is met, in terms of the relations between the first and second sun gears, among the first carrier, the second ring gear and the third carrier, and between the second carrier and the third sun gear. The elements that are fixed to or selectively connected to the input and output shafts 4, 5 may be suitably selected, as described above.

What is claimed is:

1. A speed changing gear device for an automatic transmission, including a single-pinion type first planetary gear unit having a first sun gear, a first planetary pinion meshing with the first sun gear, a first ring gear meshing with the first planetary pinion, and a first carrier rotatably supporting the first planetary pinion, a single-pinion type second planetary pinion unit having a second sun gear, a second planetary pinion meshing with the second sun gear, a second ring gear meshing with the second planetary pinion, and a second carrier rotatably supporting the second planetary pinion, and a double-pinion type third planetary gear unit having a third sun gear, at least one pair of third planetary pinions which mesh with each other and one of which meshes with the third sung ear, a third ring gear meshing with the other of said at least one pair of third planetary pinions, and a third carrier rotatably supporting said at least one pair of third planetary pinions, the first, second and third planetary gear units cooperating with each other to transmit power from an input member of the transmission to an output member of the transmission, at a selected one of different speed reduction ratios in either forward or reverse driving of the vehicle, wherein the improvement comprises:

said first and second sun gears being associated with each other, by one of fixing means for fixing said first and second sun gears to each other, of clutch means for selectively connecting the first and second sun gears to each other;

said first carrier, said second ring gear and said third carrier being associated with each other, by one of fixing means for fixing said first carrier, said second ring gear and said third carrier to each other, or clutch means for selectively connecting said first carrier, said second ring gear and said third carrier to each other;

said second carrier and said third sun gear being associated with each other, by one of fixing means for fixing said second carrier and said third sun gear to each other, or clutch means for selectively connecting said second carrier and said third sun gear; and said third ring gear being fixed to said output member of the transmission.

2. A speed changing gear device according to claim 1, wherein said third carrier is foxed to said output member of the transmission.

3. A speed changing gear device according to claim 2, wherein said first ring gear is fixed to said input member of the transmission.

4. A speed changing gear device according to claim 3, wherein said third ring gear is selectively connectable to said input member of the transmission through clutch means.

5. A speed changing gear device according to claim 2, wherein said first ring gear is selectively connectable to said input shaft of the transmission through clutch means.

6. A speed changing gear device according to claim 5, wherein said third ring gear is selectively connectable to said input shaft of the transmission through clutch means.

7. A speed changing gear device according to claim 1, wherein said first carrier and said second ring gear are fixed to each other, while said third carrier is selectively connectable to said first carrier and said second ring gear through clutch means.

8. A speed changing gear device according to claim 1, wherein said first carrier and said second ring gear are selectively connectable to each other through clutch means, while said second ring gear and said third carrier are selectively connectable to each other through clutch means.

9. A speed changing gear device according to claim 1, wherein said first and second sun gears are fixed to each other.

10. A speed changing gear device according to claim 1, wherein said second carrier and said third sun gear are fixed to each other.

11. A speed changing gear device according to claim 1, wherein said first ring gear is selectively connectable to said input member of the transmission through clutch means.

12. A speed changing gear device according to claim 1, wherein said first ring gear is fixed to said input member of the transmission.

13. A speed changing gear device according to claim 1, wherein said first and second sun gears are selectively connectable to each other by clutch means.

14. A speed changing gear device according to claim 13, wherein said clutch means for selectively connecting said first and second sun gears comprises a one-way clutch.

15. A speed changing gear device according to claim 13, wherein said second carrier and said third sun gear are selectively connectable to each other through clutch means.

16. A speed changing gear device according to claim 15, wherein said clutch means for selectively connecting said second carrier and said third sun gear comprises a multiple-disk clutch and a one-way clutch.

17. A speed changing gear device according to claim 15, wherein said clutch means for selectively connecting said second carrier and said third sun gear consists of a multiple-disk clutch.

18. A speed changing gear device according to claim 15, wherein said first ring gear is fixed to said input member of the transmission.

19. A speed changing gear device according to claim 1, wherein said first sun gear and said second sun gear are both selectively fixable to a stationary member.

20. A speed changing gear device according to claim 1, wherein said third sun gear is selectively fixable to a stationary member by brake means.

21. A speed changing gear device according to claim 20, wherein said brake means comprises a brake band and a one-way clutch.

22. A speed changing gear device according to claim 1, wherein said second sun gear is selectively fixable to a stationary member by brake means.

23. A speed changing gear device according to claim 22, wherein said brake means comprises a band brake and a one-way clutch.

24. A speed changing gear device according to claim 1, wherein said second carrier is selectively fixable to a stationary member through brake means.

25. A speed changing gear device according to claim 24, wherein said brake means comprises a band brake and a one-way clutch.

26. A speed changing gear device for an automatic transmission, including a single-pinion type first planetary gear unit having a first sun gear, a first planetary pinion meshing with the first sun gear, a first ring gear meshing with the first planetary pinion, and a first carrier rotatably supporting the first planetary pinion, a single-pinion type second planetary gear unit having a second sun gear, a second planetary pinion meshing with the second sun gear, a second ring gear meshing with the second planetary pinion, and a second carrier rotatably supporting the second planetary pinion, and a double-pinion type third planetary gear unit having a third sun gear, at least one pair of third planetary pinions which mesh with each other and one of which meshes with the third sun gear, a third ring gear meshing with the other of said at least one pair of third planetary pinions, and a third carrier rotatably supporting said at least one pair of third planetary pinions, the first, second and third planetary gear units cooperating with each other to transmit power from an input member of the transmission to an output member of the transmission, at a selected one of different speed reduction ratios in either forward or reverse driving of the vehicle, wherein the improvement comprises:
said first and second sun gears being associated with each other by clutch means for selectively connecting the first and second sun gears to each other;
said first carrier, said second ring gear, and said third carrier being associated with each other, by one of fixing means for fixing said first carrier, said second ring gear and said third carrier to each other, or clutch means for selectively connecting said first carrier, said second ring gear and said third carrier to each other; and
said second carrier and said third sun gear being associated with each other, by one of fixing means for fixing said second carrier and said third sun gear to each other, or clutch means for selectively connecting said second carrier and said third sun gear to each other.

27. A speed changing gear device for an automatic transmission, including a single-pinion type first planetary gear unit having a first sun gear, a first planetary pinion meshing with the first sun gear, a first ring gear meshing with the first planetary pinion, and a first carrier rotatably supporting the first planetary pinion, a single-pinion type second planetary gear unit having a second sun gear, a second planetary pinion meshing with the second sun gear, a second ring gear meshing with the second planetary pinion, and a second carrier rotatably supporting the second planetary pinion, and a double-pinion type third planetary gear unit having a third sun gear, at least one pair of third planetary pinions which mesh with each other and one of which meshes with the third sun gear, a third ring gear meshing with the other of said at least one pair of third planetary pinions, and a third carrier rotatably supporting said at least one pair of third planetary pinions, the first, second and third planetary gear units cooperating with each other to transmit power from an input member of the transmission to an output member of the transmission, at a selected one of different speed reduction ratios in either forward or reverse driving of the vehicle, wherein the improvement comprises:
said first and second sun gears being associated with each other, by one of fixing means for fixing said first and second sun gears to each other, or clutch means for selectively connecting the first and second sun gears to each other;
said first carrier and said second ring gear being associated with each other, by one of fixing means for fixing said first carrier and said second ring gear to each other, or clutch means for selectively connecting said first carrier and said second ring gear to each other;
said second ring gear and said third carrier being associated with each other by clutch means for selectively connecting said second ring gear and said third carrier to each other; and
said second carrier and said third sun gear being associated with each other, by one of fixing means for fixing said second carrier and said third sun gear to each other, or clutch means for selectively connecting said second carrier and said third sun gear to each other.

28. A speed changing gear device for an automatic transmission, including a single-pinion type first planetary gear unit having a first sun gear, a first planetary pinion meshing with the first sun gear, a first ring gear meshing with the first planetary pinion, and a first carrier rotatably supporting the first planetary pinion, a single-pinion type second planetary gear unit having a second sun gear, a second planetary pinion meshing with the second sun gear, a second ring gear meshing with the second planetary pinion, and a second carrier rotatably supporting the second planetary pinion, and a double-pinion type third planetary gear unit having a third sun gear, at least one pair of third planetary pinions which mesh with each other and one of which meshes with the third sun gear, a third ring gear meshing with the other of said at least one pair of third planetary pinions, and a third carrier rotatably supporting said at least one pair of third planetary pinions, the first, second and third planetary gear units cooperating with each other to transmit power from an input member of the transmission to an output member of the transmission, at a selected one of different speed reduction ratios in either forward or reverse driving of the vehicle, wherein the improvement comprises:
said first and second sun gears being associated with each other, by one of fixing means for fixing said first and second sun gears to each other, or clutch means for selectively connecting the first and second sun gears to each other;
said first carrier and said second ring gear being associated with each other by clutch means for selectively connecting said first carrier and said second ring gear to each other;
said second ring gear and said third carrier being associated with each other, by one of fixing means for fixing said second ring gear and said third carrier to each other, or clutch means for selectively connecting said second ring gear and said third carrier to each other; and said second carrier and said third sun gear being associated with each other, by one of fixing means for fixing said second carrier and second third sun gear to each other, or clutch means for selectively connecting said second carrier and said third sun gear to each other.

29. A speed changing gear device for an automatic transmission, including a single-pinion type first planetary gear unit having a first sun gear, a first planetary pinion meshing with the first sun gear, a first ring gear meshing with the first planetary pinion, and a first carrier rotatably supporting the first planetary pinion, a single-pinion type second planetary gear unit having a second sun gear, a second planetary pinion meshing with the second sun gear, a second ring gear meshing with the second planetary pinion, and a second carrier rotatably supporting the second planetary pinion, and a double-pinion type third planetary gear unit having a third sun gear, at least one pair of third planetary pinions which mesh with each other and one of which meshes with the third sun gear, a third ring gear meshing with the other of said at least one pair of third planetary pinions, and a third carrier rotatably supporting said at least one pair of third planetary pinions, the first, second and third planetary gear units cooperating with each other to transmit power from an input member of the transmission to an output member of the transmission, at a selected one of different speed reduction ratios in either forward or reverse driving of the vehicle, wherein the improvement comprises:

said first and second sun gears being associated with each other, by one of fixing means for fixing said first and second sun gears to each other, or clutch means for selectively connecting the first and second sun gears to each other;

said first carrier, said second ring gear, and said third carrier being associated with each other, by one of fixing means for fixing said first carrier, said second ring gear and second third carrier to each other, or clutch means for selectively connecting said first carrier, said second ring gear and said third carrier to each other; and said second carrier and said third sun gear being associated with each other by clutch means for selectively connecting said second carrier and said third sun gear to each other.

* * * * *

UNITED STATES PATENT AND TRADEMARK OFFICE
CERTIFICATE OF CORRECTION

PATENT NO. : 5,098,357
DATED : March 24, 1992
INVENTOR(S) : Toshiyuki Asada

It is certified that error appears in the above-indentified patent and that said Letters Patent is hereby corrected as shown below:

On the Title page, item [75], inventor: change "Yasuhiko Higushiyama" to --Toshiyuki Higashiyama--.

Signed and Sealed this

Twenty-eighth Day of September, 1993

Attest:

BRUCE LEHMAN

*Attesting Officer*        *Commissioner of Patents and Trademarks*